(12) United States Patent
Fujino

(10) Patent No.: US 11,482,914 B2
(45) Date of Patent: Oct. 25, 2022

(54) ROTARY ELECTRIC MACHINE

(71) Applicant: KABUSHIKI KAISHA KUU, Fukuoka (JP)

(72) Inventor: Katsuaki Fujino, Fukuoka (JP)

(73) Assignee: KABUSHIKI KAISHA KUU, Fukuoka (JP)

( * ) Notice: Subject to any disclaimer, the term of this patent is extended or adjusted under 35 U.S.C. 154(b) by 383 days.

(21) Appl. No.: 16/636,327

(22) PCT Filed: Jul. 25, 2018

(86) PCT No.: PCT/JP2018/027897
§ 371 (c)(1),
(2) Date: Feb. 3, 2020

(87) PCT Pub. No.: WO2019/026725
PCT Pub. Date: Feb. 7, 2019

(65) Prior Publication Data
US 2021/0028677 A1    Jan. 28, 2021

(30) Foreign Application Priority Data

Aug. 3, 2017  (JP) .............................. JP2017-150676
Nov. 16, 2017  (JP) .............................. JP2017-221198

(51) Int. Cl.
  *H02K 21/14*    (2006.01)
  *H02K 21/24*    (2006.01)
(52) U.S. Cl.
  CPC ............. *H02K 21/14* (2013.01); *H02K 21/24* (2013.01)

(58) Field of Classification Search
  CPC .... H02K 21/24; H02K 1/2793; H02K 1/2705; H02K 1/2796; H02K 1/2798;
  (Continued)

(56) References Cited

U.S. PATENT DOCUMENTS 6,137,203 A * 10/2000 Jermakian ................. B60L 7/14
                                                  310/191
6,509,664 B2 * 1/2003 Shah ..................... H02K 21/042
                                                  310/156.19
(Continued)

FOREIGN PATENT DOCUMENTS

EP    2381564 A1    10/2011
EP    2733832 A1    5/2014
(Continued)

*Primary Examiner* — Thomas Truong
(74) *Attorney, Agent, or Firm* — Heedong Chae; Lucem, PC

(57) ABSTRACT

A rotary electric machine includes a rotor in which a plurality of permanent magnets are disposed along a rotation circumference and in which a magnetic pole of the permanent magnet is directed in a direction along a rotational axis and a stator in which a plurality of windings are disposed along the rotation circumference in a direction in which the magnetic pole of the permanent magnet is directed. The stator is formed in a direction in which a magnetic path from an end of the stator to an inside of the stator intersects a main magnetic flux direction from the rotor when the rotor is directed toward ends of first to four windings. A plurality of stators, provided along the rotational axis of the rotor, are respectively placed at positions at which gaps between the windings deviate from each other in a rotation circumference direction.

20 Claims, 21 Drawing Sheets

(58) Field of Classification Search
CPC ........ H02K 16/00; H02K 16/02; H02K 16/04;
H02K 16/025; H02K 3/16; H02K 3/20;
H02K 1/148; H02K 21/14; H02K 3/46;
H02K 1/2753; H02K 11/046; H02K 11/30
USPC ............................. 310/114, 156.32–156.37
See application file for complete search history.

(56) References Cited

U.S. PATENT DOCUMENTS

| | | | | |
|---|---|---|---|---|
| 2008/0067883 | A1* | 3/2008 | Witt | H02K 21/24 |
| | | | | 310/179 |
| 2009/0295245 | A1* | 12/2009 | Abe | H02K 1/2793 |
| | | | | 310/156.35 |
| 2011/0025158 | A1* | 2/2011 | Aiki | H02K 17/02 |
| | | | | 310/156.01 |
| 2012/0119608 | A1* | 5/2012 | Chen | H02K 21/24 |
| | | | | 310/208 |

FOREIGN PATENT DOCUMENTS

| | | |
|---|---|---|
| JP | 60-226751 A | 11/1985 |
| JP | 2000-184627 A | 6/2000 |
| JP | 2006-238623 A | 9/2006 |
| JP | 2013-21888 A | 1/2013 |
| JP | 2014-135852 A | 7/2014 |
| JP | 2014-147238 A | 8/2014 |
| JP | 2017-5806 A | 1/2017 |
| WO | 2016195430 A1 | 12/2016 |

* cited by examiner

FIG. 20

Electric generator G1 (inventive article)

| Generated power (W) | 0.0 | 51.0 | 97.5 | 140.9 | 181.6 | 220.0 | 256.3 | 290.5 | 322.8 | 353.8 | 382.6 |
|---|---|---|---|---|---|---|---|---|---|---|---|
| Input power (W) * | 0.0 | 53.0 | 106.0 | 157.0 | 207.0 | 257.0 | 302.0 | 350.0 | 393.0 | 436.0 | 479.0 |
| Generated power/input power (%) | | 96.23% | 91.98% | 89.75% | 87.73% | 85.60% | 84.87% | 83.00% | 82.14% | 81.15% | 79.87% |

Electric generator G2 (comparative article)

| Generated power (W) | 0.0 | 51.0 | 97.5 | 140.9 | 181.6 | 220.0 | 256.3 | 290.5 | 322.8 | 353.8 | 382.6 |
|---|---|---|---|---|---|---|---|---|---|---|---|
| Input power (W) * | 0.0 | 56.0 | 116.0 | 171.0 | 228.0 | 282.0 | 335.0 | 389.0 | 438.0 | 498.0 | 561.0 |
| Generated power/input power (%) | | 91.07% | 84.05% | 82.40% | 79.65% | 78.01% | 76.51% | 74.68% | 73.70% | 71.04% | 68.20% |

*Input power = Total power consumption - Power consumption at no-load

ROTARY ELECTRIC MACHINE

TECHNICAL FIELD

The present invention relates to a rotary electric machine that has a rotor formed of permanent magnets and a stator formed of windings.

BACKGROUND ART

A rotary electric machine, such as an electric motor or an electric generator, includes a rotor and a stator. There has been known a stator that is to perform excitation with respect to the rotor and in which windings are wound on an iron core such that the axis of the winding is directed toward a rotor as in conventional electric motors described in, for example, Patent Documents 1 and 2 or in which windings are wound on a part of a C-shaped iron core, and a rotor is disposed between mutually-facing both ends of the iron core as in a conventional electric motor described in Patent Document 3.

However, in the conventional electric motors described in Patent Documents 1 to 3, a state in which the magnetic pole of the stator and the magnetic pole of the rotor momentarily face each other is reached when the magnetic pole of the rotor passes by the magnetic pole of the stator. Therefore, a great flux change caused by the rotor occurs when the rotor rotates and passes in front of the stator, and therefore a great counter electromotive force occurs in the stator when the rotor rotates. Therefore, in the conventional electric motors, a great counter electromotive force occurs in the stator when the rotor is rotated by the stator, and therefore a high voltage is required to allow the rotor to make high rotation against the counter electromotive force.

Patent Document 4 describes a toroidal-core type actuator that has a stator in which windings are wound on a hollow cylindrical core and a rotor that is formed of m permanent magnets whose north and south poles are alternately arranged in a circumferential direction and that is rotatably disposed inside the core of the stator through a minute air gap.

According to Patent Document 4 mentioned here, the stator is formed in a direction in which a magnetic path from the end of the stator to the inside of the stator intersects a main magnetic flux direction from the rotor when a magnetic pole of the rotor faces an end of the stator. Therefore, when the rotor passes while facing the end of the stator, it is possible to make the counter electromotive force smaller than in the conventional electric motors of Patent Documents 1 to 3 because the magnetic path from the end of the stator to the inside of the stator follows the direction that intersects the main magnetic flux direction from the rotor and because a change in the magnetic flux is smaller than in the conventional electric motors in which the windings are directed in the radial direction.

CITATION LIST

Patent Documents

Patent Document 1: Japanese Published Unexamined Patent Application No. 2014-135852
Patent Document 2: Japanese Published Unexamined Patent Application No. 2014-147238
Patent Document 3: Japanese Published Unexamined Patent Application No. S60-226751
Patent Document 4: Japanese Published Unexamined Patent Application No. 2000-184627

SUMMARY OF INVENTION

Technical Problem

In the toroidal-core type actuator of Patent Document 4, a rotor portion in which rotor magnets whose number of magnetic poles is 2 rotate around a rotational shaft is shown.

However, when the plurality of rotor magnets are stored in a rotor housing and are rotated along a rotational circumference while the magnetic pole of the rotor magnet is directed toward coils of a stator, there is a concern that the magnets will fly out from the housing toward the coils because of a centrifugal force when the rotor portion is rotated at a high speed.

The reason is that, even if a concave portion is formed at an outer circumferential surface of the housing, and stores the rotor magnets in the concave portion, and is covered with a lid so that the rotor magnets do not fly out, the lid is liable to become brittler in proportion to a reduction in thickness of the lid in order to form a minute air gap between the rotor magnets and the coils.

Therefore, in the rotor portion formed such that the rotor magnets whose magnetic poles are directed toward the coils of the stator are stored at the outer circumferential surface of the housing, it is impossible to maintain reliability when the rotor portion is operated in a high rotation state for a long period of time.

Therefore, the present invention aims to provide a rotary electric machine that is capable of making high rotation without applying a high voltage by restraining the occurrence of a counter electromotive force and that is capable of maintaining the reliability of a rotor even if high rotation is continuously performed for a long period of time.

Solution to Problem

The rotary electric machine of the present invention is characterized by including a rotor in which a plurality of permanent magnets are disposed in a housing along a rotation circumference and in which a magnetic pole of the permanent magnet is directed in a direction along a rotational axis and a stator that has a plurality of windings disposed along a rotation circumference, and is characterized in that the winding is formed in a direction in which a magnetic path from an end of the winding to an inside of the winding intersects a main magnetic flux direction from the permanent magnet when the magnetic pole of the permanent magnet is directed toward the winding, in that a plurality of the stators are provided along the rotational axis of the rotor, and in that the stators are respectively placed at positions at which gaps between the windings forming the stator deviate from each other in a rotation circumference direction.

According to the rotary electric machine of the present invention, when the rotor passes while facing the ends of the windings of the stator, the magnetic path from the end of the winding to the inside of the winding follows a direction that intersects the main magnetic flux direction from the rotor, and, as a result, the rotary electric machine of the present invention is smaller in a flux change than a conventional electric motor in which a winding is directed so as to follow a radial direction, thus making it possible to make a counter electromotive force smaller than the conventional electric motor. Additionally, the permanent magnet of the rotor is directed so as to follow the direction along the rotational axis, and the stator has the winding disposed along the rotation circumference in a direction followed by the magnetic pole of the permanent magnet. In addition, a plurality of the stators are provided along the rotational axis of the rotor, and the stators are respectively placed at positions at which gaps between the windings forming the stator deviate from each other in a rotation circumference direction.

Therefore, in the permanent magnet stored in the housing, a direction in which a centrifugal force acts and a direction in which the magnetic pole faces the winding become different from each other, thus making it difficult for the permanent magnet to fly out from the housing even if the rotor is rotated at a high speed by bringing the permanent magnet close to the winding and by disposing the permanent magnet in the housing. Additionally, even if the rotor is about to be decelerated or stopped because of gaps between the ends of one stator, the rotor is capable of being rotationally driven by one other stator.

Additionally, the rotary electric machine of the present invention is characterized by including a rotor in which a plurality of permanent magnets are disposed in a housing along a rotation circumference and in which a magnetic pole of the permanent magnet is directed in a direction along a rotational axis and a stator that has a plurality of windings disposed along a rotation circumference, and is characterized in that the winding is formed in a direction in which a magnetic path from an end of the winding to an inside of the winding intersects a main magnetic flux direction from the permanent magnet when the magnetic pole of the permanent magnet is directed toward the winding and in that an auxiliary winding is provided between ends of the plurality of windings.

According to the rotary electric machine of the present invention, when the rotor passes while facing the ends of the windings of the stator, the magnetic path from the end of the winding to the inside of the winding follows a direction that intersects the main magnetic flux direction from the rotor, and, as a result, the rotary electric machine of the present invention is smaller in a flux change than a conventional electric motor in which a winding is directed so as to follow a radial direction, thus making it possible to make a counter electromotive force smaller than the conventional electric motor. Additionally, the permanent magnet of the rotor is directed so as to follow the direction along the rotational axis, and the stator has the winding disposed along the rotation circumference in a direction followed by the magnetic pole of the permanent magnet. In addition, an auxiliary winding is provided between the ends of the plurality of windings.

Therefore, in the permanent magnet stored in the housing, a direction in which a centrifugal force acts and a direction in which the magnetic pole faces the winding become different from each other, thus making it difficult for the permanent magnet to fly out from the housing even if the rotor is rotated at a high speed by bringing the permanent magnet close to the winding and by disposing the permanent magnet in the housing. Additionally, it is possible to allow the auxiliary winding to complement a magnetic force generated between the ends of the plurality of windings, and therefore it is possible to enhance the rotational driving force of the rotor by means of the auxiliary winding.

The rotors can be disposed with the stator between the rotors on both sides, respectively.

The stator can be formed of the windings each of which has a circular-arc shape along the rotation circumference of the rotor. The winding of the stator is formed in a circular-arc shape along the circumferential direction centering on the rotational axis of the rotor, and therefore a magnetic path from the end of the stator to the inside of the stator can be formed so as to follow a direction that intersects the main magnetic flux direction from the rotor.

The stator can be formed of the windings in each of which an axis along a tangent of the rotation circumference of the rotor is linear. The linear axis of the winding makes production easy.

The stator may be formed of a plurality of windings that surround a rotational center of the rotor and that are connected in parallel with each other. The formation of a plurality of windings connected in parallel with each other makes it possible to restrict the resistance value of the winding to a low value.

If a cross section of the winding is formed so that a length in a direction along a rotational axis is shorter than a length in a radial direction of a rotation circumference, it is possible to dispose the permanent magnet in a state in which the permanent magnet has been brought close to the axis of the winding.

If a power generation winding is provided coaxially with the auxiliary winding, it is possible to generate electric power from the power generation winding.

It is possible to connect a rotation speed control portion that adjusts an electric current emitted from the power generation winding.

The power generation winding is coaxial with the auxiliary winding, and therefore a magnetic field generated in the power generation winding acts to aid the auxiliary winding. Therefore, it is possible to adjust the number of rotations of the permanent magnet in accordance with an electric current flowing to the rotation speed control portion.

The rotation speed control portion can include a rectifier portion connected to the power generation winding and a consumption portion that consumes an electric current emitted from the rectifier portion. It is possible to adjust the number of rotations of the permanent magnet in accordance with an electric current in which the consumption portion consumes a direct current rectified by the rectifier portion, and it is possible to effectively use an electric current in the consumption portion.

Advantageous Effects of Invention

The rotary electric machine of the present invention is smaller in a flux change than a conventional electric motor in which a winding is directed so as to follow a radial direction, and therefore it is possible to make a counter electromotive force smaller than the conventional electric motor, and therefore it is possible to achieve high rotation without applying a high voltage. Additionally, the rotary electric machine of the present invention is capable of making it difficult for the permanent magnet to fly out from the housing even if the rotor is rotated at a high speed.

Therefore, the rotary electric machine of the present invention restrains the occurrence of a counter electromotive force, thus making it possible to achieve high rotation without applying a high voltage and possible to maintain the reliability of the rotor even if high rotation is continuously performed for a long period of time.

BRIEF DESCRIPTION OF THE DRAWINGS

FIGS. 1A-B are perspective views to describe an electric motor as a rotary electric machine according to Embodiment 1 of the present invention, in which FIG. 1A is a perspective view of the electric motor, and FIG. 1B is a perspective view of the electric motor seen through a housing and through a shielding plate;

FIGS. 3A-B are perspective views to describe the operation of the electric motor shown in FIGS. 1A-B, in which FIG. 3A is a view showing a state in which one end is a north pole and the other end is a south pole, and FIG. 3B is a view showing a state in which one end is a south pole and the other end is a north pole;

FIGS. 5A-B are perspective views to describe an electric motor as a rotary electric machine according to Embodiment 2 of the present invention, in which FIG. 5A is a perspective view of the electric motor, and FIG. 5B is a perspective view of the electric motor seen through a housing and through a shielding plate;

FIG. 20 is a table of generated power with respect to input power measured by the measuring system of FIG. 19.

Figure 1A:
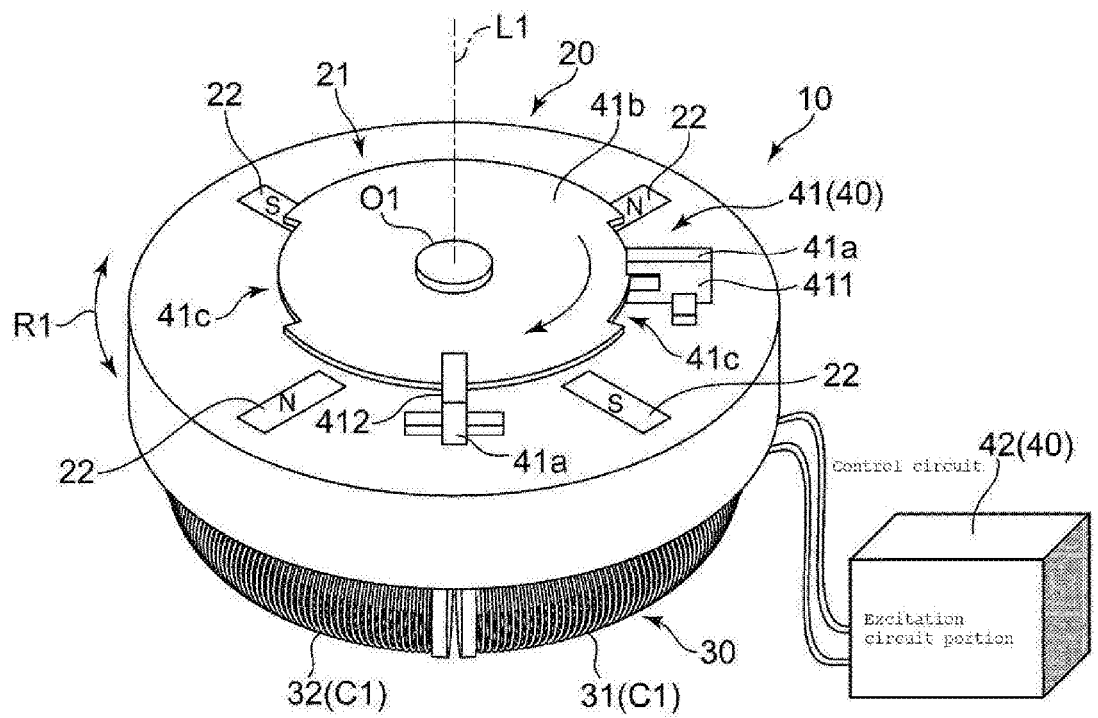

REFERENCE SIGNS LIST 10, 11, 12, 12a, 13, 13a, 14, 15, 16 Electric motor
20, 200 Rotor
200a First rotor
200b Second rotor
200c Third rotor
21 Housing
22, 202 Permanent magnet
30, 30a, 30b, 300, 320 Stator
300a First stator
300b Second stator
301 to 304 Winding
310 Core
311 Collar portion
312 Core member
305 Connection wire
31 to 34 First winding to fourth winding
31T1, 31T2, 32T1, 32T2, 33T1, 33T1, 33T2, 34T1, 34T2 End
33a to 33d Winding
35a to 35d Power generation winding
40 Control circuit
41 Sensor portion
411 First sensor portion
412 Second sensor portion
41a Photo interrupter
41b Shielding plate
41c Circular-arc cutout portion
42 Excitation circuit portion
421a, 421b First FET
422a, 422b Second FET
423a, 423b Third FET
G Gate terminal
S Source terminal
D Drain terminal
R11, R12, R21, R22, R31, R32, R41, R42 Resistor
C11, C12 Capacitor
D11, D12, D21, D22 Diode
50 Rotation speed control portion
51 Rectifier portion
52 Consumption portion
C1, C2, C3 Winding
O1 Output shaft
R1 Rotation circumference
F1 Main magnetic flux direction
L1 Rotational axis
L2, L3 Axis
R Magnetic path
S1 Gap
G1 Electric generator (inventive article)
G2 Electric generator (comparative article)
500 Measurement system
501 Electric power meter
502 Inverter
503 Electric motor
504 Load portion
504a Diode bridge
504b Capacitor
504c Electronic load device

DETAILED DESCRIPTION OF THE EMBODIMENTS OF THE INVENTION

Embodiment 1

An electric motor will be described as an example of a rotary electric machine according to Embodiment 1 of the present invention with reference to the drawings.

Figure 1B:
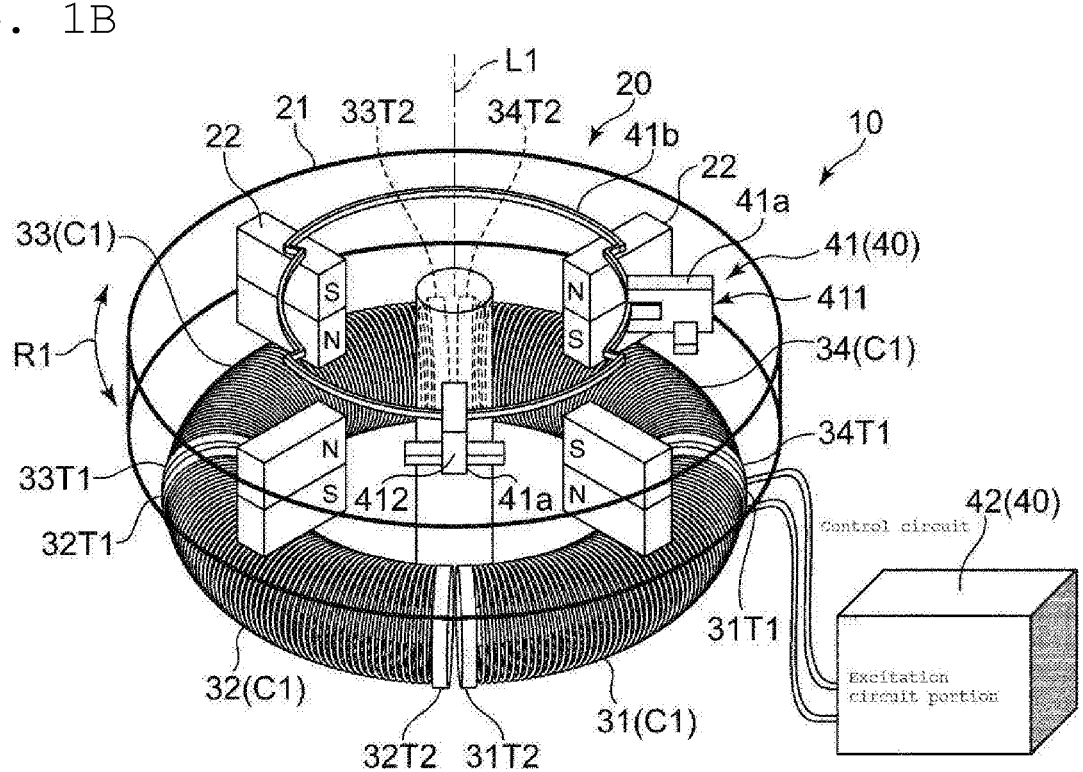

FIGS. 1A-B are schematic views to describe the electric motor according to Embodiment 1, and an enclosure that supports a stator and an output shaft or that supports a sensor portion etc., is not shown in FIGS. 1A-B.

An electric motor 10 shown in FIGS. 1A-B includes a rotor 20 formed coaxially with an output shaft O1 and a stator 30 that excites a magnetic flux by which the rotor 20 is rotationally driven.

In the rotor 20, a plurality of permanent magnets 22 are disposed in a housing 21 along a rotation circumference R1, and either one of the magnetic poles, i.e., either a north pole or a south pole of the permanent magnet 22 is directed in a direction along a rotational axis L1.

The housing 21 is formed in the shape of a disk, and is used to store the permanent magnets 22 at equal intervals along the rotation circumference R1.

The permanent magnet 22 is formed in a rectangular parallelepiped, and either one of the magnetic poles, i.e., either the north pole or the south pole is alternately arranged in the housing 21 while being directed toward the stator 30. In Embodiment 1, four permanent magnets 22 are arranged at intervals of an angle of 90 degrees therebetween in the housing 21.

A neodymium magnet whose magnetic force is stronger than other magnets is usable as the permanent magnet 22.

The stator 30 is formed of a plurality of windings C1 (a first winding 31 to a fourth winding 34), and the windings C1 are disposed along the rotation circumference R1 in a direction in which the magnetic pole of the permanent magnet 22 is directed.

The stator 30 is formed in a direction in which a magnetic path R (see FIG. 4) from ends of the windings C1 to the inside of the windings intersects a main magnetic flux direction F1 from the rotor 20 when the rotor 20 faces the ends of the windings C1 (ends 31T1, 31T2, 32T1, 32T2, 33T1, 33T2, 34T1, and 34T2).

In Embodiment 1, the stator 30 is formed in the shape of a circular arc in which the windings C1 are arranged along the rotation circumference R1 centering on the rotational axis L1 of the rotor 20.

The end 31T1 of the first winding 31 and the end 34T1 of the fourth winding 34 are connected to an excitation circuit portion 42 of a control circuit 40, and the ends 31T2 and 32T2 facing each other, the ends 32T1 and 33T1 facing each other, and the ends 33T2 and 34T2 facing each other are respectively connected together by wires, and, as a result, the first winding 31 to the fourth winding 34 are connected in series, and yet these may be connected in parallel.

Wires of the windings C1 consisting of the first to fourth windings 31 to 34 are wound so that the one-side ends 31T1 and 34T1 facing each other and the one-side ends 32T1 and 33T1 facing each other generate the same pole when the windings C1 are energized and so that the other-side ends 31T2 and 32T2 facing each other and the other-side ends 33T2 and 34T2 facing each other generate the same pole when the windings C1 are energized.

The control circuit 40 includes a sensor portion 41 and the excitation circuit portion 42.

The sensor portion 41 includes a first sensor portion 411 and a second sensor portion 412 to detect a timing at which the one-side ends 31T1, 34T1, the one-side ends 32T1, 33T1 are set as north poles whereas the other-side ends 31T2, 32T2, the other-side ends 33T2, 34T2 are set as south poles, and, in an opposite way, to detect a timing at which the one-side ends 31T1, 34T1, the one-side ends 32T1, 33T1 are set as south poles whereas the other-side ends 31T2, 32T2, the other-side ends 33T2, 34T2, are set as north poles, respectively.

The first sensor portion 411 and the second sensor portion 412 include a transmission-type photo interrupter 41a by a light emitting diode and a photodiode that are fixed by a supporting member (not shown) and a disk-shaped shielding plate 41b that rotates together with the rotor 20 and that passes between the light emitting diode and the photodiode of the transmission-type photo interrupter 41a.

Although the photo interrupter 41a shown in of FIGS. 1A-B is provided individually in correlation with the first sensor portion 411 and individually in correlation with the second sensor portion 412, the shielding plate 41b is provided so as to be shared between the first sensor portion 411 and the second sensor portion 412 in the present embodiment. Although the shielding plate 41b is shared between the first sensor portion 411 and the second sensor portion 412, the shielding plate 41b is separately shown in FIG. 2 in correlation with the photo interrupter 41a.

A circular-arc cutout portion 41c (see FIG. 1A) by which an energization timing and an energization period of time are prescribed is formed along a circumferential direction in a part of a circumferential edge of the shielding plate 41b. This circular-arc cutout portion 41c is formed within a range of 90 degrees in accordance with the position of the north pole of the permanent magnet 22, and is formed at two places of the circumferential edge of the shielding plate 41b.

The photo interrupter 41a is formed at the position of 0 degrees and at the position of 90 degrees under the condition that the position of 0 degrees is the position of the one-side ends 31T1, 34T1 at which the first winding 31 and the fourth winding 34 face each other and under the condition that the position of 180 degrees is the position of the one-side ends 32T1, 33T1 at which the second winding 32 and the third winding 33 face each other.

Figure 2:
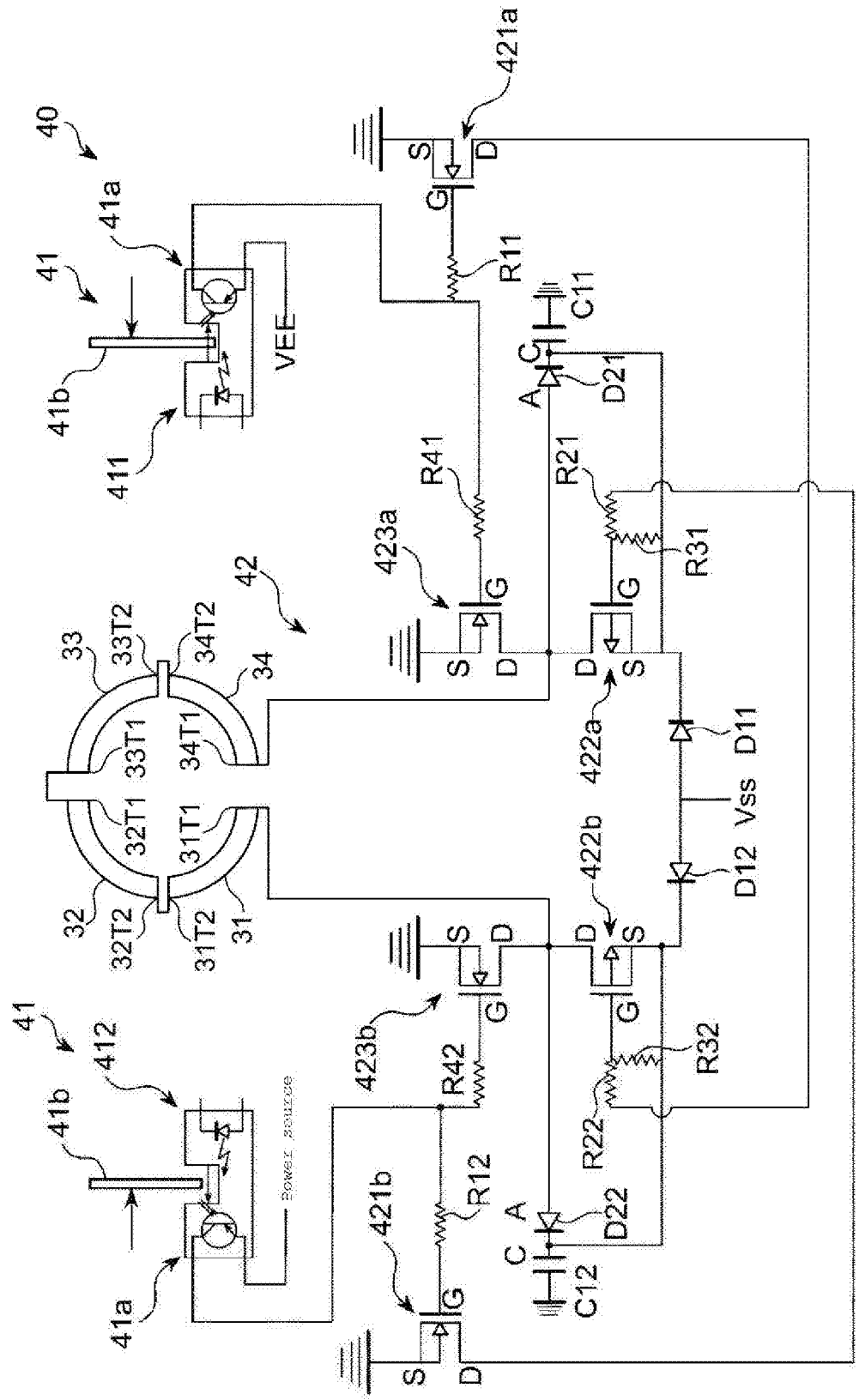
FIG. 2 is a circuit diagram to describe the operation of an excitation circuit portion of a control circuit in the electric motor shown in FIGS. 1A-B.

The excitation circuit portion 42 shown in FIG. 2 controls energization to the first to fourth windings 31 to 34.

The excitation circuit portion 42 controls an energization direction to the first to fourth windings 31 to 34 by means of transistors of from first FETs 421a and 421b to third FETs 423a and 423b while making the first and second sensor portions 411 and 412 as a set of sensor portions.

The first FET 421a and the third FET 423a are each an n-type FET. The second FETs 422a and 422b are each a p-type FET.

In the first FETs 421a and 421b, agate terminal G is connected to the photo interrupter 41a through resistors R11 and R12. In the first FETs 421a and 421b, a source terminal S is grounded.

In the second FETs 422a and 422b, a source terminal S is connected to a power source through diodes D11 and D12, and is grounded through capacitors C11 and C12. Additionally, gate terminals G of the second FETs 422a and 422b are connected to drain terminals D of the first FETs 421a and 421b through resistors R21 and R22, and are connected to source terminals S of the second FETs 422a and 422b through resistors R31 and R32, respectively. Drain terminals D of the second FETs 422a and 422b are connected to anode terminals A of diodes D21 and D22, and are connected to drain terminals D of the third FETs 423a and 423b, respectively.

In the third FETs 423a and 423b, a gate terminal G is connected to the photo interrupter 41a through resistors R41 and R42. Source terminals S of the third FETs 423a and 423b are grounded.

A wire extending from the one-side end 34T1 of the fourth winding 34 is connected to the drain terminal D of the second FET 422a, and is connected to the drain terminal D of the third FET 423a.

A wire extending from the one-side end 31T1 of the first winding 31 is connected to the drain terminal D of the second FET 422b, and is connected to the drain terminal D of the third FET 423b.

The operation of the electric motor 10 according to Embodiment 1 of the present invention that has been configured as above will be described with reference to the drawings.

Electric power is supplied to the control circuit 40 shown in FIGS. 1A-B.

For example, when the north pole of the permanent magnet 22 is directed toward the photo interrupter 41a of the first sensor portion 411, the circular-arc cutout portion 41c of the shielding plate 41b is positioned at the photo interrupter 41a of the first sensor portion 411.

Light of the photo interrupter 41a of the first sensor portion 411 is transmitted by the circular-arc cutout portion 41c of the shielding plate 41b, and, as a result, a phototransistor of the photo interrupter 41a of the first sensor portion 411 is energized.

As shown in FIG. 2, the phototransistor of the first sensor portion 411 is energized, and, as a result, the gate terminal G of the first FET 421a and the gate terminal G of the third FET 423a, which are connected to the photo interrupter 41a through the resistors R11 and R41, are brought into a first voltage in which the first FET 421a and the third FET 423a reach an ON state.

Figure 3A:
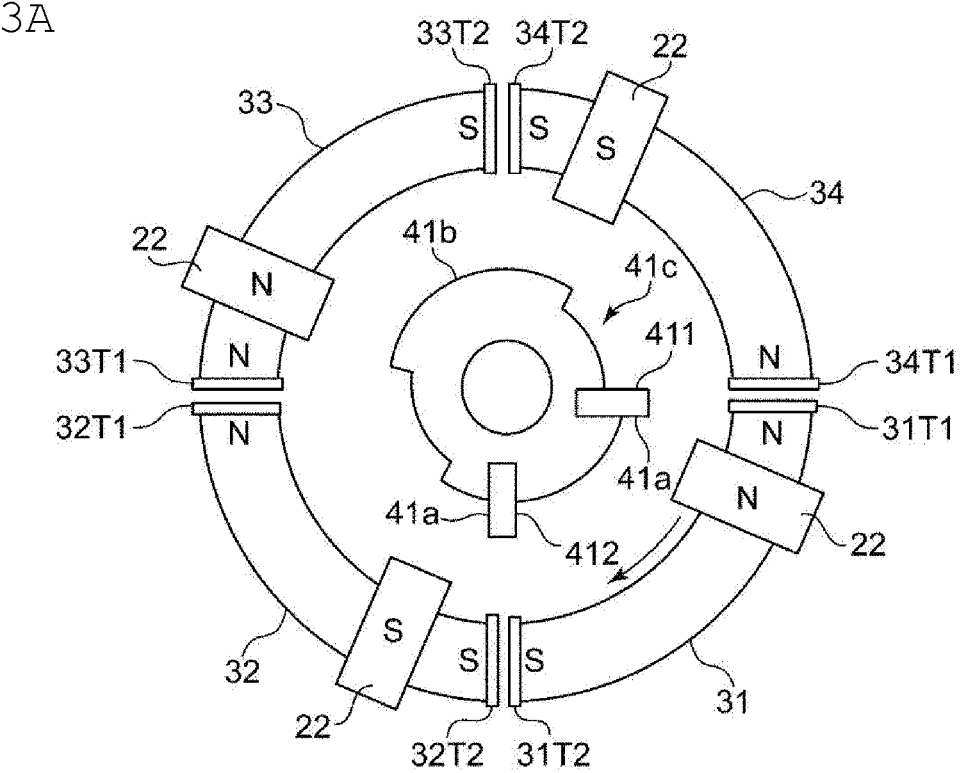

Additionally, when the circular-arc cutout portion 41c is positioned at the photo interrupter 41a of the first sensor portion 411 as shown in FIG. 3A, the circular-arc cutout portion 41c is not positioned at the photo interrupter 41a of the second sensor portion 412, and therefore the photo interrupter 41a of the second sensor portion 412 is in a non-energized state.

Therefore, as shown in FIG. 2, the gate terminal G of the first FET 421b and the gate terminal G of the third FET 423b, which are connected to the photo interrupter 41a of the second sensor portion 412 through the resistors R12 and R42, are brought into a second voltage (0 V) that is lower than the first voltage and in which the first FET 421b and the third FET 423b reach an OFF state.

When the first FET 421b is in an OFF state, the gate terminal G of the second FET 422a connected to the drain terminal D of the first FET 421b through the resistor R21 is brought into the first voltage, in which the second FET 422a reaches an OFF state, by means of the resistor R31 connected to a power source Vss.

When the first FET 421a is in an ON state, the gate terminal G of the second FET 422b is brought into a second voltage in which the second FET 422b reaches an ON state because the resistor R22 is connected to the drain terminal D of the first FET 421a.

When the ON state and the OFF state of the first FETs 421a, 421b to the third FETs 423a, 423b are determined in this way, an electric current emitted from the power source Vss flows into the source terminal S of the second FET 422b through the diode D12, and flows from the drain terminal D of the second FET 422b to the one-side end 31T1 of the first winding 31.

Thereafter, the electric current successively flows from the first winding 31 to the second, third, and fourth windings 32, 33, and 34, and then flows from the one-side end 34T1 of the fourth winding 34 to the drain terminal D of the third FET 423a, and flows from the drain terminal D of the third FET 423a to the source terminal S.

As a result, as shown in FIG. 3A, the magnetic field of the same pole (north pole) that repels the north pole of the permanent magnet 22 is generated in the end 31T1 of the first winding 31 and the end 34T1 of the fourth winding 34 and in the end 32T1 of the second winding 32 and the end 33T1 of the third winding 33, and the magnetic field of the same pole (south pole) that repels the south pole of the permanent magnet 22 is generated in the other-side ends 31T2, 32T2 and in the other-side ends 33T2, 34T2.

Both poles of the permanent magnet 22 repel by the magnetic field generated by the first to fourth windings 31 to 34, and the rotor 20 rotates.

Figure 3B:
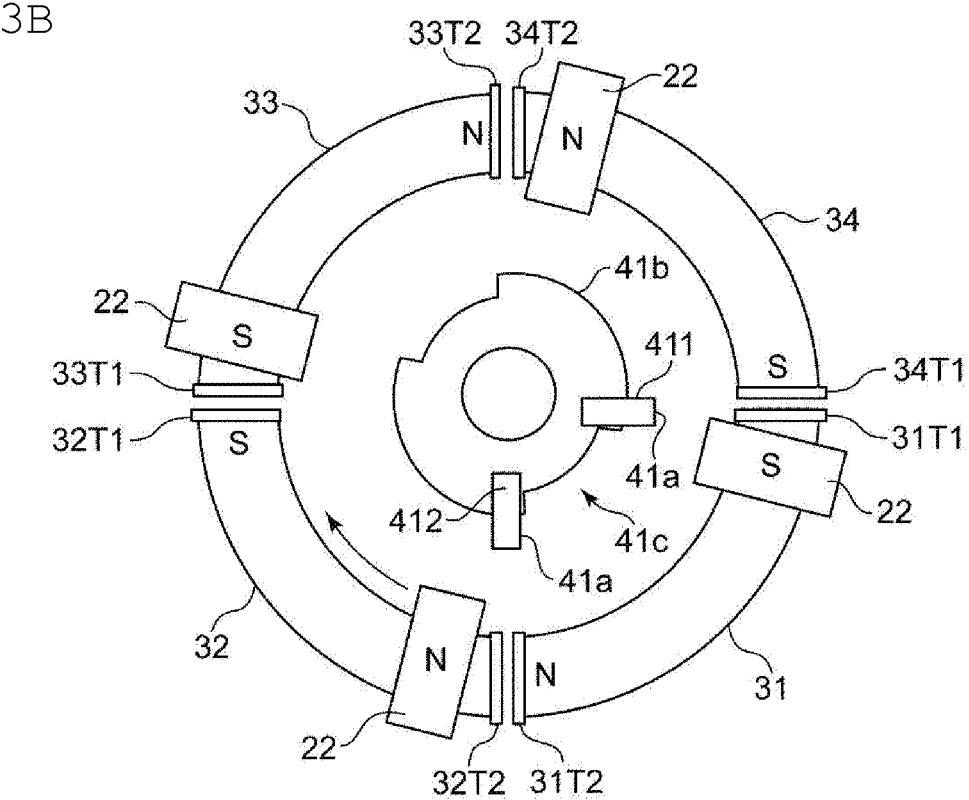

On the other hand, as shown in FIG. 3B, the circular-arc cutout portion 41c of the shielding plate 41b is positioned at the photo interrupter 41a of the second sensor portion 412 of the sensor portions 41.

Light of the photo interrupter 41a of the second sensor portion 412 is transmitted by the circular-arc cutout portion 41c of the shielding plate 41b, and, as a result, a phototransistor of the photo interrupter 41a of the second sensor portion 412 is energized.

As shown in FIG. 2, the phototransistor of the second sensor portion 412 is energized, and, as a result, the gate terminal G of the first FET 421b and the gate terminal G of the third FET 423b, which are connected to the photo interrupter 41a through the resistors R12 and R42, are brought into a first voltage in which the first FET 421b and the third FET 423b reach an ON state.

Additionally, when the circular-arc cutout portion 41c is positioned at the photo interrupter 41a of the second sensor portion 412, the circular-arc cutout portion 41c is not positioned at the photo interrupter 41a of the first sensor portion 411, and therefore the photo interrupter 41a of the first sensor portion 411 is in a non-energized state. Therefore, the gate terminal G of the first FET 421a and the gate terminal G of the third FET 423a, which are connected to the photo interrupter 41a of the first sensor portion 411 through the resistors R11 and R41, are brought into a second voltage in which the first FET 421a and the third FET 423a reach an OFF state.

When the first FET 421a is in an OFF state, the gate terminal G of the second FET 422b connected to the drain terminal D of the first FET 421a through the resistor R22 is brought into the first voltage, in which the second FET 422b reaches an OFF state, by means of the resistor R32 connected to the power source Vss.

When the first FET 421b is in an ON state, the gate terminal G of the second FET 422a is brought into a second voltage in which the second FET 422a reaches an ON state because the resistor R21 is connected to the drain terminal D of the first FET 421b.

When the ON state and the OFF state of the first FETs 421a, 421b to the third FETs 423a, 423b are determined in this way, an electric current emitted from the power source Vss flows into the source terminal S of the second FET 422a through the diode D11, and flows from the drain terminal D of the second FET 422a to the one-side end 34T1 of the fourth winding 34.

Thereafter, the electric current successively flows from the fourth winding 34 to the third, second, and first windings 33, 32, and 31, and then flows from the one-side end 31T1 of the first winding 31 to the drain terminal D of the third FET 423b, and flows from the drain terminal D of the third FET 423b to the source terminal S.

As a result, as shown in FIG. 3B, the magnetic field of the same pole (south pole) that repels the south pole of the permanent magnet 22 is generated in the end 31T1 of the first winding 31 and the end 34T1 of the fourth winding 34 and in the end 32T1 of the second winding 32 and the end 33T1 of the third winding 33, and the magnetic field of the same pole (north pole) that repels the north pole of the permanent magnet 22 is generated in the other-side ends 31T2, 32T2 and in the other-side ends 33T2, 34T2.

Both poles of the permanent magnet 22 repel by the magnetic field generated by the first to fourth windings 31 to 34, and the rotor 20 rotates.

Furthermore, when the rotor 20 rotates, another circular-arc cutout portion 41c formed in the shielding plate 41b is positioned at the photo interrupter 41a of the first sensor portion 411, and, as a result, the magnetic field of the magnetic pole shown in FIG. 3A is generated in the stator 30.

The magnetic pole shown in FIG. 3A and the magnetic pole shown in FIG. 3B are alternately generated in the stator 30 in this way, thus enabling the rotor 20 to continuously rotate.

In the electric motor 10, the stator 30 has the first winding 31 to the fourth winding 34 that are each formed in the shape of a circular arc along the circumferential direction centering on the rotational axis L1 of the rotor 20.

Figure 4:
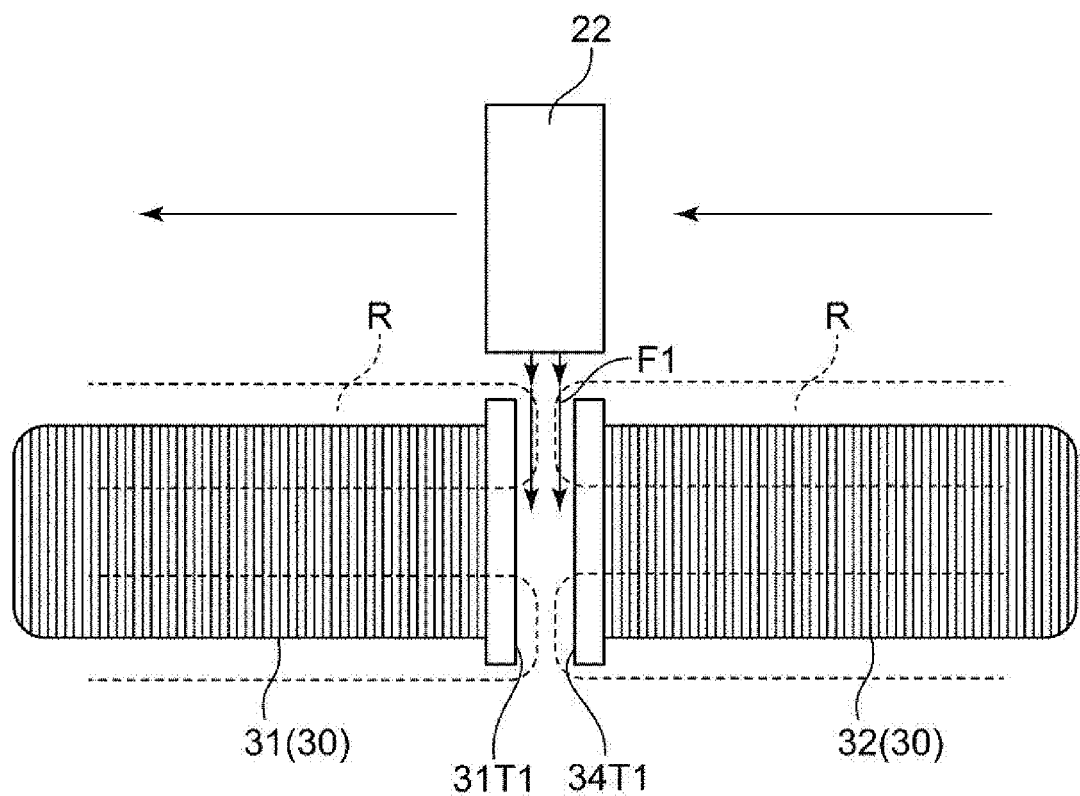
FIG. 4 is a view to describe a state of magnetic lines of force between permanent magnets of a rotor and windings of a stator in the electric motor shown in FIGS. 1A-B.

Therefore, a magnetic path in the stator 30 is created along the circular-arc shapes of the windings (the first winding 31 to the fourth winding 34) as shown in FIG. 4. When each magnetic pole of the permanent magnets 22 of the rotor 20 passes while facing the ends of the first to fourth windings 31 to 34 (the end 31T1 of the first winding 31 and the end 34T1 of the fourth winding 34 in FIG. 4), a magnetic path from the end of the stator 30 to the inside of the stator 30 follows a direction that intersects the main magnetic flux direction F1 from the rotor 20.

Therefore, the main magnetic flux from the rotor 20 does not cross so as to straightly enter the inside of the cylinder of the winding C1. Therefore, the electric motor 10 is smaller in a flux change than a conventional electric motor in which a winding is directed so as to follow a radial direction, thus making it possible to make a counter electromotive force smaller than the conventional electric motor.

Additionally, as shown in FIGS. 1A-B, the permanent magnet 22 of the rotor 20 is directed so as to follow the direction along the rotational axis L1, and the stator 30 has the windings C1 disposed along the rotation circumference R1 in a direction in which the magnetic pole of the permanent magnet 22 is directed.

Therefore, in the permanent magnet 22 stored in the housing 21, a direction (radial direction of the rotation circumference R1) in which a centrifugal force acts and a direction in which the magnetic pole faces the winding C1 become different from each other, thus making it difficult for the permanent magnet 22 to fly out from the housing 21 even if the rotor 20 is rotated at a high speed by bringing the permanent magnets 22 close to the windings C1 and by disposing the permanent magnets 22 in the housing 21.

Therefore, it is possible to perform a long-time operation in a state in which the high-speed rotation of the rotor 20 is maintained.

Therefore, the electric motor 10 according to Embodiment 1 restrains the occurrence of a counter electromotive force, thus making it possible to achieve high rotation without applying a high voltage and possible to maintain the reliability of the rotor 20 even if high rotation is continuously performed for a long period of time.

Although the first to fourth windings 31 to 34 are each formed in a circular-arc shape along the rotation circumference R1 and are disposed in a circular shape as the stator 30 as shown in FIG. 1B in Embodiment 1, the first to fourth windings 31 to 34 may be made larger or smaller in curvature than the rotation circumference if a magnetic path from the end of the stator to the inside of the stator follows a direction that intersects a main magnetic flux direction from the rotor. Additionally, without being perpendicularly intersected with a magnetic-pole direction in which the magnetic pole of the permanent magnet is directed, the center in a length direction of the winding may be inclined with respect to the magnetic-pole direction.

Embodiment 2

An electric motor will be described as an example of a rotary electric machine according to Embodiment 2 of the present invention with reference to the drawings. It should be noted that an enclosure that supports a stator, an output shaft, a sensor portion, etc., is not shown in FIG. 5A and FIG. 5B as in FIGS. 1A-B. Additionally, in FIGS. 5A-B, the same reference sign is given to the same constituent as in FIGS. 1A-B, and a description of the constituent is omitted.

In an electric motor 11 according to Embodiment 2, windings C2 of a stator 30a are disposed along a rotation circumference R1 in a direction in which the magnetic pole of a permanent magnet 22 is directed. Additionally, in the windings C2, an axis L2 along a tangent of the rotation circumference R1 of a rotor 20 is formed linearly.

Even if the axis L2 of each winding C2 of the stator 30a is formed linearly in this way, the winding C2 of the stator 30a is formed in a direction in which a magnetic path from the end of the winding C2 to the inside of the winding C2 intersects a main magnetic flux direction from the permanent magnet 22 when the permanent magnet 22 faces the end of the winding C2, and the winding C2 is disposed along the rotation circumference R1 in the direction in which the magnetic pole of the permanent magnet 22 is directed. Therefore, it is possible to obtain the same operation and effect as in Embodiment 1.

Additionally, the axis L2 of the winding C2 is formed linearly, and therefore, when wires are wound on a core, the wires are wound more evenly and easily than the circular-arc winding C1 (see FIGS. 1A-B). Therefore, the winding C2 whose axis L2 is linear makes it possible to improve workability.

For example, in the stator 30a having the winding C2 whose axis L2 is linear, if the magnetic pole of the permanent magnet of the rotor is placed at a central portion surrounded by the windings C2 of the stator 30a while being directed toward the outside in a rotational radial direction, the distance between the magnetic pole of the permanent magnet and the winding C2 becomes short at a barrel part of the winding C1 and becomes long at an end part of the winding C1, hence does not become constant.

However, in the electric motor 11, the permanent magnet 22 of the rotor 20 rotates above the winding C2 disposed along the rotation circumference R1, and therefore it is possible to even out the distance between the magnetic pole of the permanent magnet 22 and the winding C2.

Embodiment 3

An electric motor will be described as an example of a rotary electric machine according to Embodiment 3 of the present invention with reference to the drawings. An electric motor 12 according to Embodiment 3 shown in FIG. 6 is an electric motor configured by adding auxiliary windings 33*a* to 33*d* to the electric motor 10 according to Embodiment 1 shown in FIGS. 1A-B.

Figure 6:
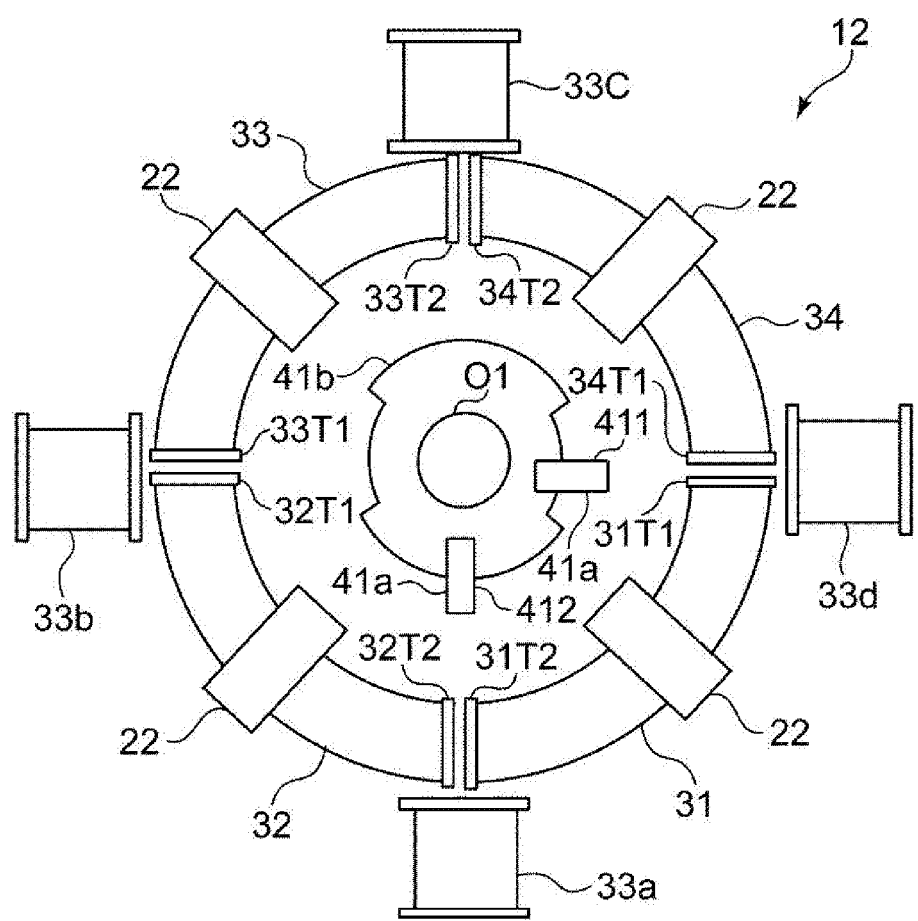
FIG. 6 is a view to describe an electric motor as a rotary electric machine according to Embodiment 3 of the present invention, showing a rotor, a stator, a sensor portion, and auxiliary windings.

In FIG. 6, the same reference sign is given to the same constituent as in FIGS. 1A-B, and a description of the constituent is omitted.

As shown in FIG. 6, the auxiliary windings 33*a* to 33*d* are windings for enhancing a magnetic force each of which is formed in the shape of a straight pipe. The windings 33*a* to 33*d* are disposed in a state in which the axes of the windings 33*a* to 33*d* are directed in a radial direction of the rotation circumference outside the ends that face each other of the first to fourth windings 31 to 34 (the end 31T1 and the end 34T1, the end 31T2 and the end 32T2, the end 32T1 and the end 33T1, the end 33T2 and the end 34T2).

The winding 33*a* is controlled by the control circuit 40 so as to become the same pole as the end 31T1 and the end 34T1, the winding 33*b* is controlled by the control circuit 40 so as to become the same pole as the end 31T2 and the end 32T2, the winding 33*c* is controlled by the control circuit 40 so as to become the same pole as the end 32T1 and the end 32T1, and the winding 33*d* is controlled by the control circuit 40 so as to become the same pole as the end 33T2 and the end 34T21.

The auxiliary windings 33*a* to 33*d* are provided so as to generate the same pole as the magnetic pole generated by the end of the winding while directing their axes between the plurality of windings (first to fourth windings 31 to 34), and, as a result, it is possible to allow the windings 33*a* to 33*d* to complement the magnetic force by the respective ends of the first to fourth windings 31 to 34.

Therefore, the windings 33*a* to 33*d* make it possible to enhance the rotational driving force of the rotor 20.

Modification of Embodiment 3

A modification of the electric motor according to Embodiment 3 will be described with reference to the drawings.

Figure 7:
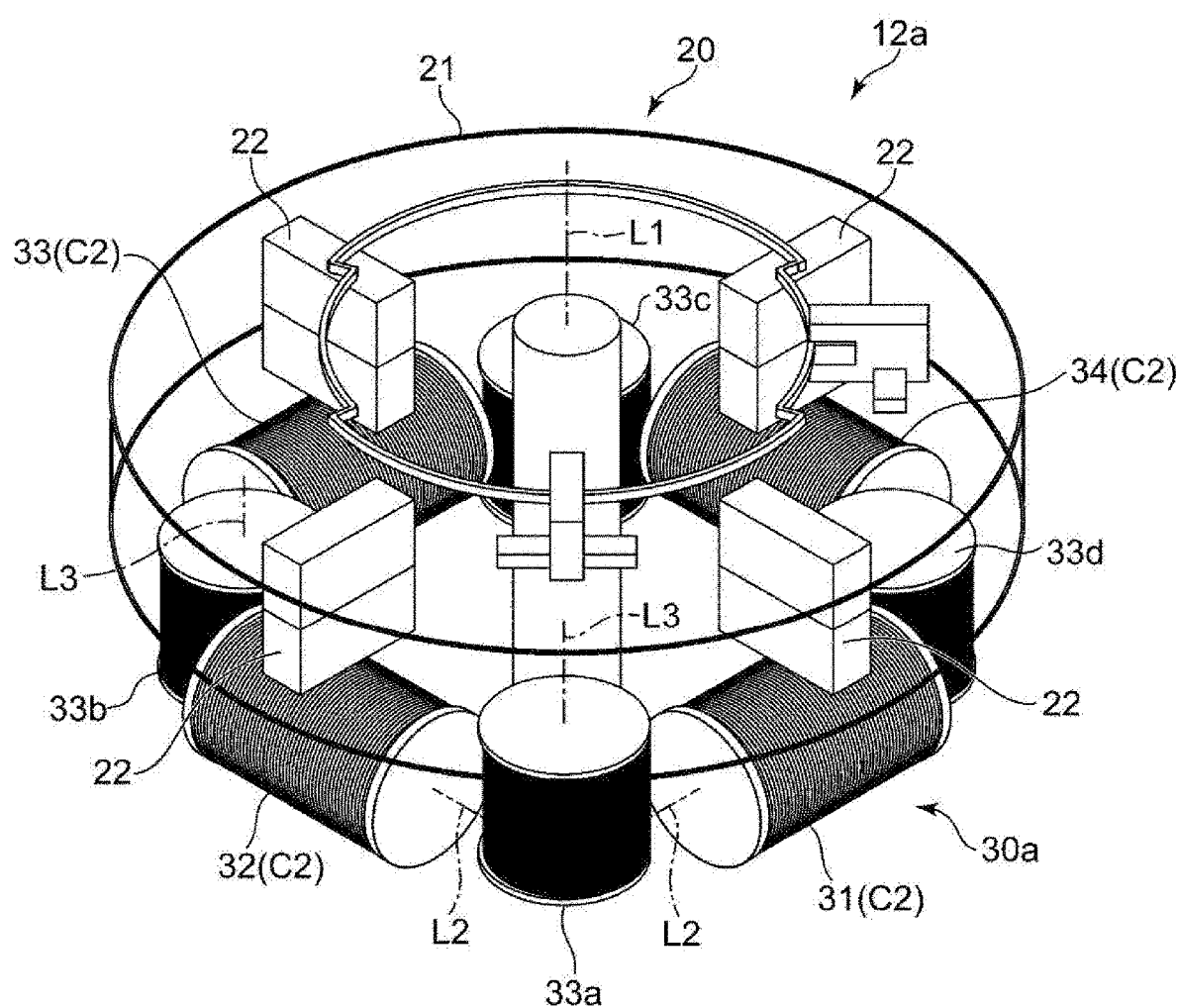
FIG. 7 is a view to describe a modification of the electric motor according to Embodiment 3 shown in FIG. 6.

In an electric motor 12*a* according to Embodiment 3 shown in FIG. 7, an axis L3 of each of the auxiliary windings 33*a* to 33*d* is directed toward the rotor-20 side along the rotational axis L1 with respect to the electric motor 12 according to Embodiment 3 shown in FIG. 6, and the winding C2 of the stator 30*a* is formed on the linear axis L2.

Figure 5A:
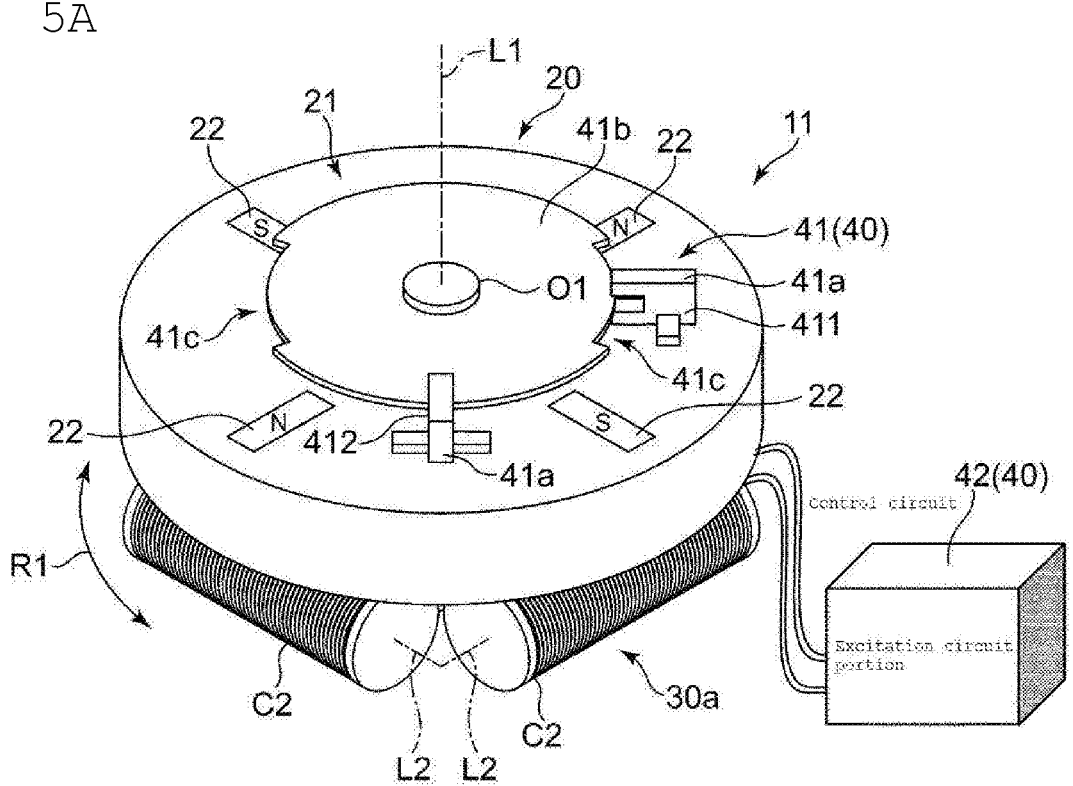
Figure 5B:
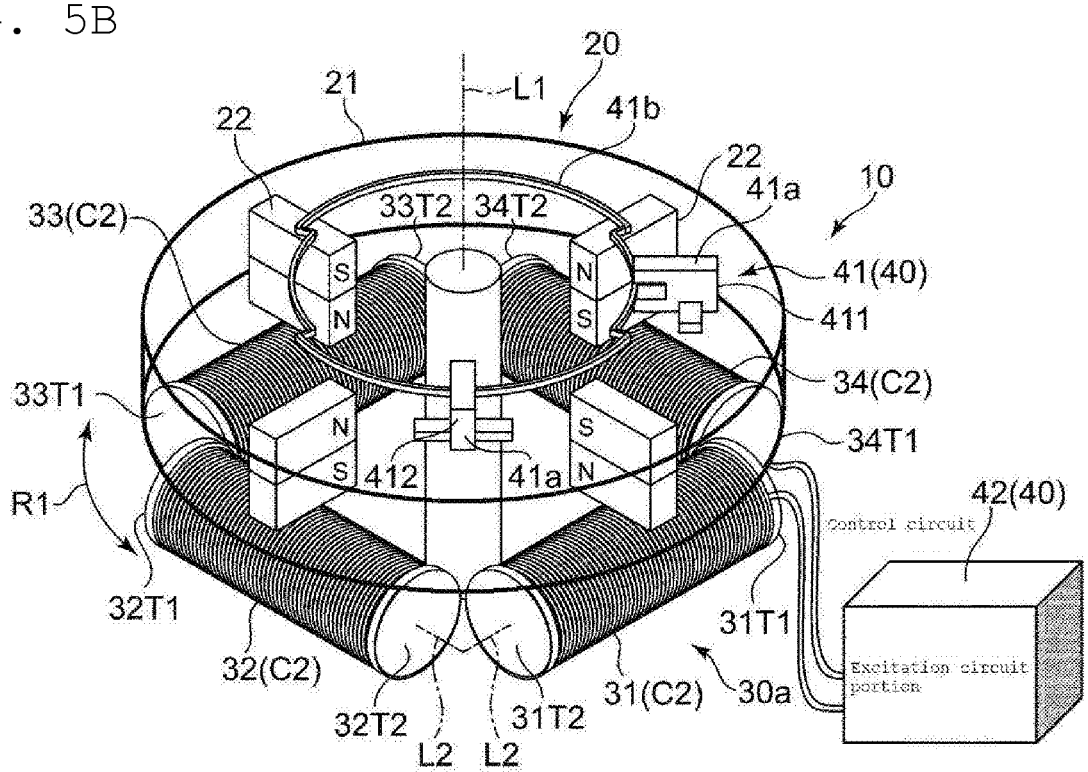

In FIG. 7, the same reference sign is given to the same constituent as in FIGS. 5A-B and as in FIG. 6, and a description of the constituent is omitted.

As thus described, with respect to the auxiliary windings 33*a* to 33*d*, magnetic fluxes from the windings 33*a* to 33*d* are directed in the direction of the rotor 20 when the axes L3 are directed toward the rotor-20 side along the rotational axis L1. Therefore, the windings 33*a* to 33*d* make it possible to more strongly reinforce the magnetic force by the respective ends of the first to fourth windings 31 to 34.

Embodiment 4

An electric motor will be described as an example of a rotary electric machine according to Embodiment 4 of the present invention with reference to the drawings. An electric motor 13 according to Embodiment 4 shown in FIG. 8 is an electric motor configured by adding power generation windings 35*a* to 35*d* to the electric motor 12 according to Embodiment 3 shown in FIG. 6.

Figure 8:
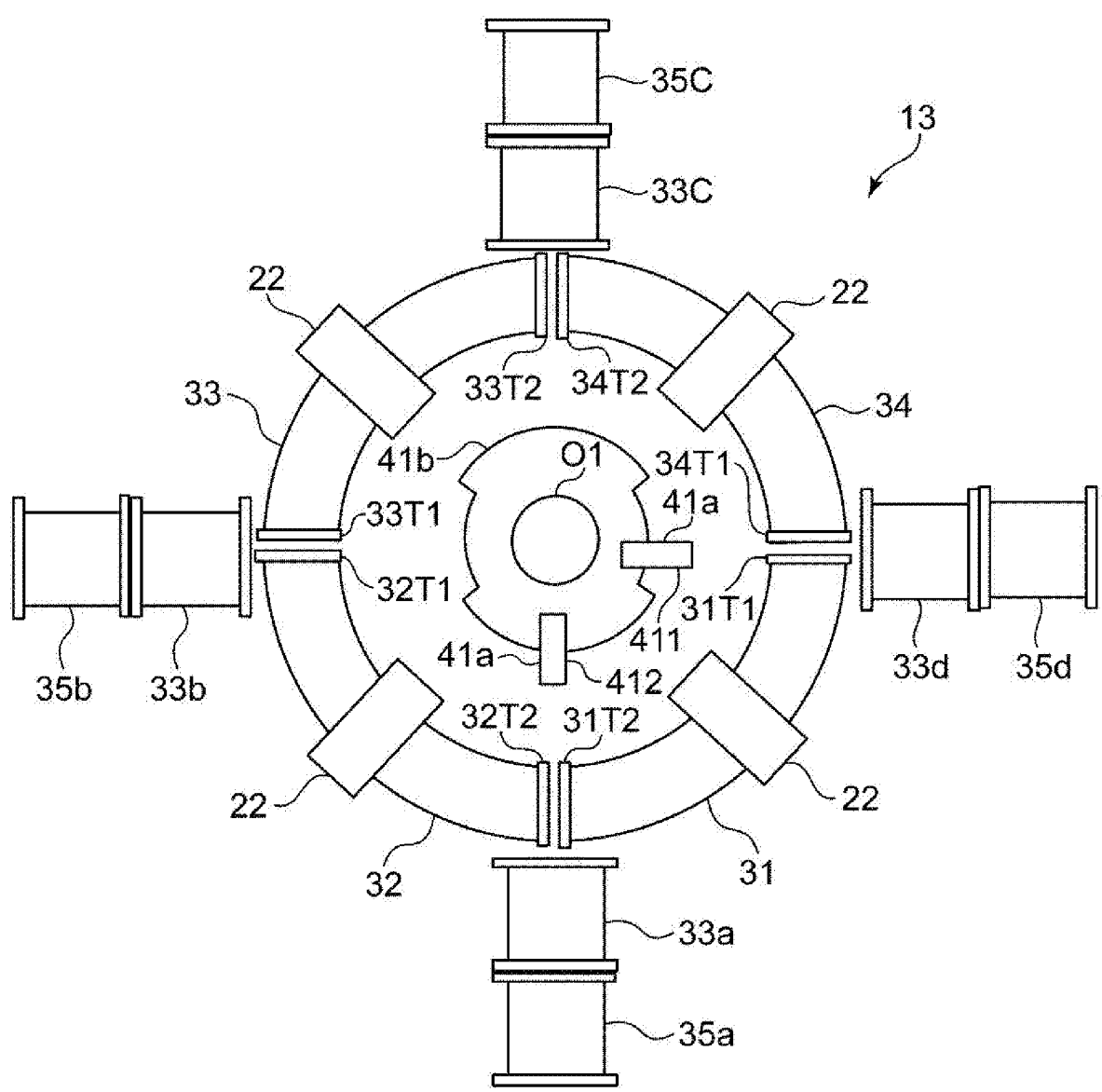
FIG. 8 is a view to describe an electric motor as a rotary electric machine according to Embodiment 4 of the present invention, showing a rotor, a stator, a sensor portion, auxiliary windings, and power generation windings.

In FIG. 8, the same reference sign is given to the same constituent as in FIG. 6, and a description of the constituent is omitted.

As shown in FIG. 8, the electric motor 13 is provided with power generation windings 35*a* to 35*d* coaxially with the auxiliary windings 33*a* to 33*d*.

Figure 9:
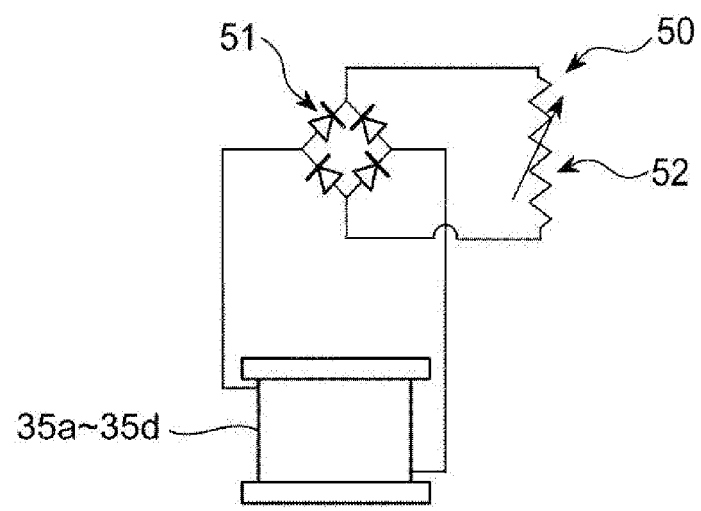
FIG. 9 is a circuit diagram to describe a rotation speed control portion connected to the power generation windings of the electric motor shown in FIG. 8.

A rotation speed control portion 50 is connected to the power generation windings 35*a* to 35*d* as shown in FIG. 9.

The rotation speed control portion 50 includes a rectifier portion 51 and a consumption portion 52. The rectifier portion 51 can be formed of a diode bridge.

Although the consumption portion 52 can be used as a variable resistor, a load that effectively uses electrical energy may be connected instead of the variable resistor. For example, it can be used as a charging circuit for a battery, or as an illuminator, or as an electric motor. The consumption portion 52 can be designed to set a resistance value from a short-circuited state to an open state.

The rotation speed control portion 50 can be provided individually for each of the power generation windings 35*a* to 35*d*, and can be provided so as to be shared between the power generation windings 35*a* to 35*d*.

Next, a detailed description will be given of the operation of the rotation speed control portion 50 that adjusts an electric current flowing from the power generation windings 35*a* to 35*d*.

The electric motor 13 of FIG. 8 is operated, and the windings 33*a* to 33*d* are energized, thus making it possible to generate an electromotive force in the power generation windings 35*a* to 35*d*. The electric current flowing from the power generation windings 35*a* to 35*d* of FIG. 9 is subjected to full-wave rectification by the rectifier portion 51, and is allowed to flow to the consumption portion 52. In the consumption portion 52, electric power transmitted from the power generation windings 35*a* to 35*d* is consumed by a resistance value that has been set.

In the power generation windings 35*a* to 35*d* disposed coaxially with the windings 33*a* to 33*d*, electromagnetic induction by the permanent magnet 22 of the rotor 20 becomes larger than electromagnetic induction by the windings 33*a* to 33*d*, and an electric current generated thereby generates a magnetic field that aids the windings 33*a* to 33*d* when a consumption current of the consumption portion 52 becomes large.

At this time, the number of rotations of the rotor 20 is reduced from a consumption current (output current) of 0 A to a certain current, and is then raised gradually although an output voltage that is output to the consumption portion 52 decreases if an input voltage that is input into the windings 33*a* to 33*d* is fixed and if an output current that is taken out of the power generation windings 35*a* to 35*d* by means of the consumption portion 52 is raised.

The consumption current is adjusted by the rotation speed control portion 50 of the electric motor 13 in this way, and, as a result, it is possible to adjust the number of rotations, and therefore it is possible to improve the electric motor 13 so as to be a new electric motor capable of controlling the number of rotations.

The rectifier portion 51 can be omitted when the consumption portion 52 is brought into a short-circuited state although the consumption portion 52 is connected through the rectifier portion 51.

Modification of Embodiment 4

A modification of the electric motor according to Embodiment 4 will be described with reference to the drawings.

Figure 10:
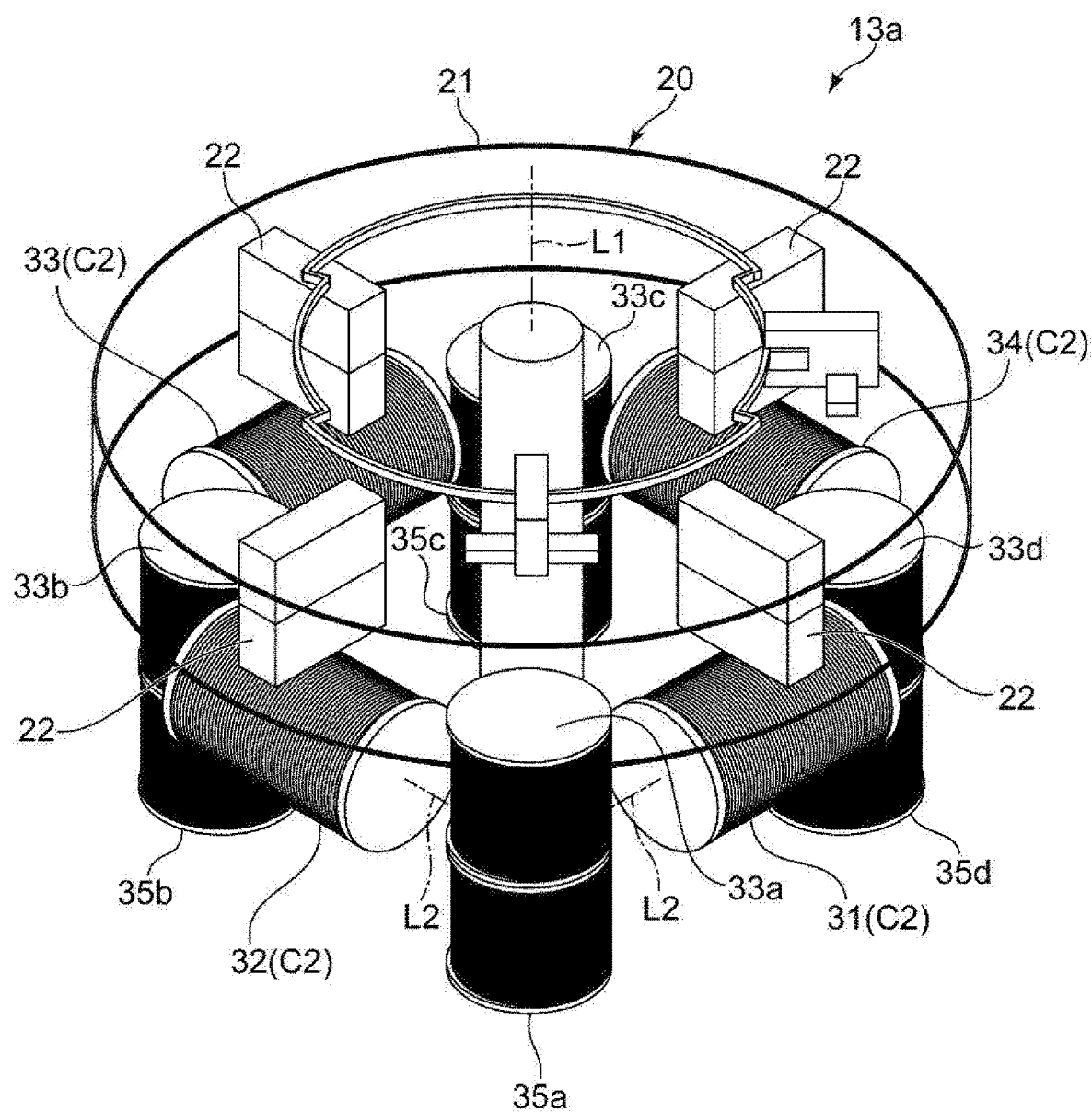
FIG. 10 is a view to describe a modification of the electric motor according to Embodiment 4 shown in FIG. 9.

In an electric motor 13a according to Embodiment 4 shown in FIG. 10, the axis L3 of each of the auxiliary windings 33a to 33d and of each of the power generation windings 35a to 35d is directed toward the rotor-20 side along the rotational axis L1 with respect to the electric motor 12 according to Embodiment 4 shown in FIG. 8, and the winding C2 of the stator 30a is formed on the linear axis L2.

In FIG. 10, the same reference sign is given to the same constituent as in FIGS. 5A-B and as in FIG. 8, and a description of the constituent is omitted.

As thus described, with respect to the auxiliary windings 33a to 33d and the power generation windings 35a to 35d disposed coaxially with the auxiliary windings 33a to 33d, magnetic fluxes from the windings 33a to 33d are directed in the direction of the rotor 20 when the axes L3 are directed toward the rotor-20 side along the rotational axis L1. Therefore, the windings 33a to 33d make it possible to more strongly reinforce the magnetic force by the respective ends of the first to fourth windings 31 to 34, and the magnetic force from the auxiliary windings 33a to 33d makes it possible to generate electric power in the power generation windings 35a to 35d.

Embodiment 5

An electric motor will be described as an example of a rotary electric machine according to Embodiment 5 of the present invention with reference to the drawings.

FIG. 11 to FIG. 16 are schematic views to describe the electric motor according to Embodiment 5, and an enclosure that supports a stator and an output shaft or that supports a sensor portion, etc., is not shown in FIG. 11 to FIG. 16. Additionally, a housing by which permanent magnets of a rotor are held and rotated on a rotational axis is not shown in FIG. 11 to FIG. 16. Still additionally, a similar component can be used as the excitation circuit portion 42 (see FIG. 2), and therefore a description of the excitation circuit portion 42 is omitted.

Figure 11:
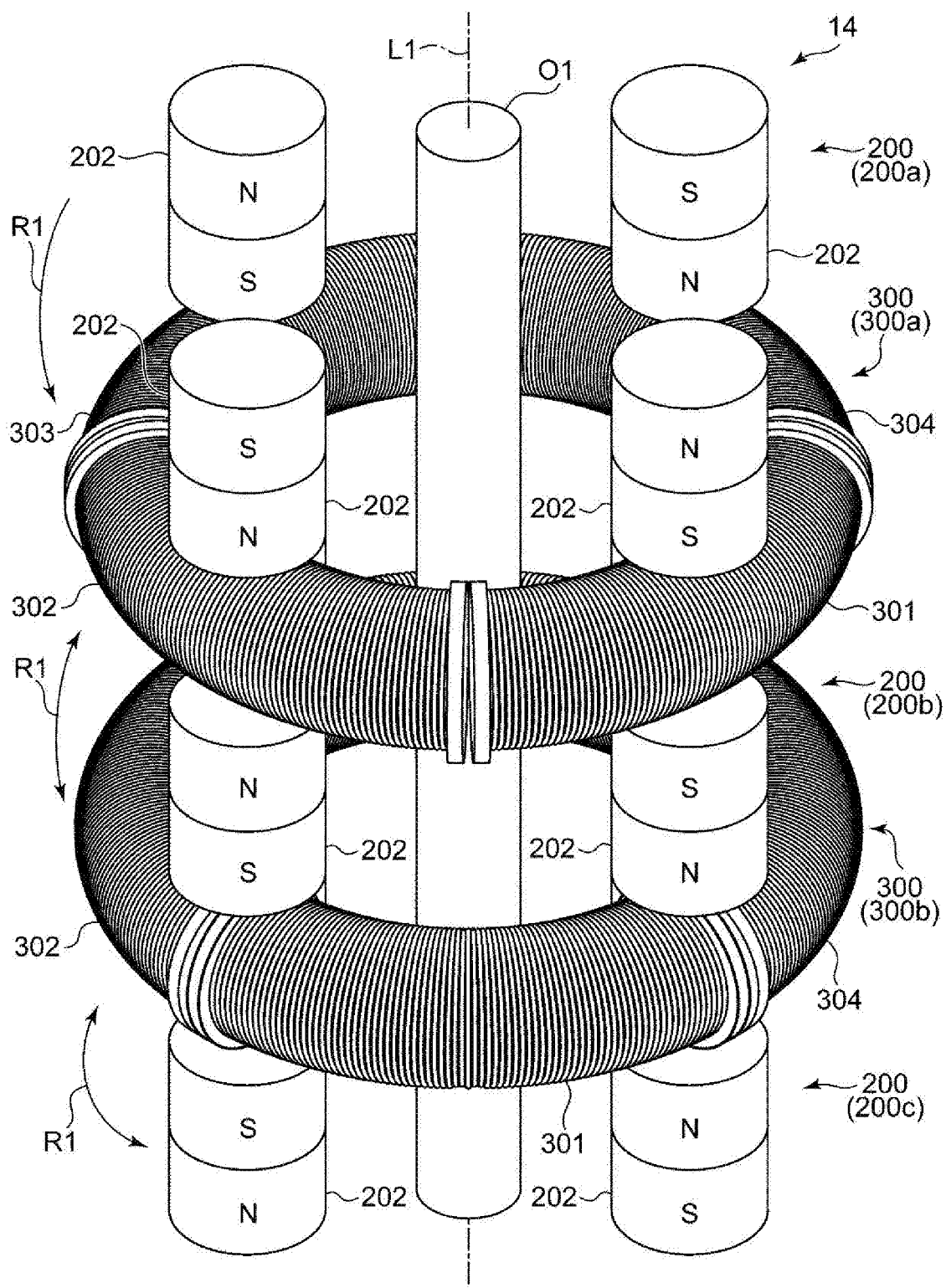
FIG. 11 is a perspective view to describe an electric motor as a rotary electric machine according to Embodiment 5 of the present invention.

As shown in FIG. 11, in an electric motor 14 according to Embodiment 5, either one of the magnetic poles, i.e., either the north pole or the south pole of a cylindrical permanent magnet 202 of a rotor 200 is directed in a direction along a rotational axis L1 of the rotor 200, and a stator 300 is disposed along a rotation circumference R1 in a direction in which the magnetic pole of the rotor 200 is directed.

The rotor 200 is disposed on both sides in an up-down direction with the stator 300 placed between the rotors 200, and is connected to an output shaft O1. In the electric motor 14 according to Embodiment 5, three rotors 200, i.e., an upper stage rotor (first rotor 200a), an intermediate stage rotor (second rotor 200b), and a lower stage rotor (third rotor 200c) are provided along the up-down direction. Therefore, two stators 300, i.e., an upper stage stator (first stator 300a) and a lower stage stator (second stator 300b) are disposed between the rotors 200 and between the rotors 200, respectively.

Therefore, the upper stage stator 300 (first stator 300a) is sandwiched between the upper and intermediate stage rotors 200 (first rotor 200a and second rotor 200b), and the lower stage stator 300 (second stator 300b) is sandwiched between the intermediate and lower stage rotors 200 (second rotor 200b and third rotor 200c).

The respective permanent magnets 202 of the rotor 200 are placed at the same position when viewed from a direction along the rotational axis L1.

The upper stage rotor 200 (first rotor 200a) is disposed such that the north pole and the south pole of the permanent magnet 202 are alternately directed toward the lower stator 300.

The magnetic pole (the magnetic pole facing the permanent magnet 202 of the upper stage rotor 200) that is directed upwardly in the intermediate stage rotor 200 (second rotor 200b) is disposed so as to become identical in the magnetic pole with the upper stage rotor 200. Additionally, the magnetic pole directed downwardly of the intermediate stage rotor 200 is a magnetic pole opposite to the magnetic pole directed upwardly of the intermediate stage rotor 200.

The magnetic pole (the magnetic pole facing the permanent magnet 202 of the intermediate stage rotor 200) that is directed upwardly in the lower stage rotor 200 (third rotor 200c) is disposed so as to become identical with the magnetic pole directed downwardly in the intermediate stage rotor 200.

A plurality of stators 300 each of which includes the windings 301 to 304 are provided along the rotational axis L1, and the upper stage stator 300 (first stator 300a) and the lower stage stator 300 (second stator 300b) are respectively disposed at positions at which gaps between the windings 301 to 304 deviate by 45 degrees in a rotation circumference direction.

Figure 12:
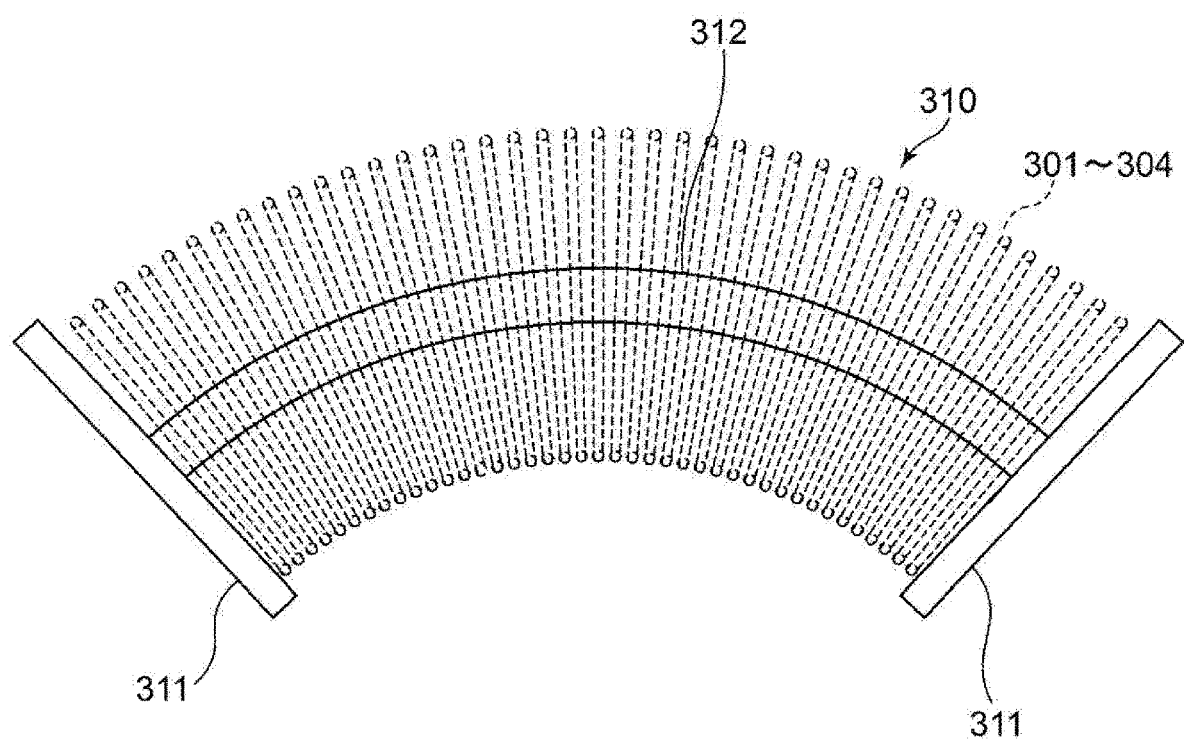
FIG. 12 is a view of a core on which windings of a stator in the electric motor shown in FIG. 11 are wound.

The stator 300 is formed such that the circular-arc windings 301 to 304, which are formed by quadrisecting a circumference in a circumferential direction centering on the rotational axis L1 of the rotor 200, are wound on a core 310 shown in FIG. 12.

The core 310 shown in FIG. 12 is formed of disk-shaped collar portions 311 respectively positioned at its both ends and a core member 312 by which the collar portions 311 are connected together and around which the windings 301 to 304 are wound.

The core 310 can be made of metallic material, and can also be made of resinous material. If the core 310 is made of resinous material, magnetic saturation does not occur, and therefore it is preferable to use a resinous core when a high electric current is passed through the windings 301 to 304.

Figure 14:
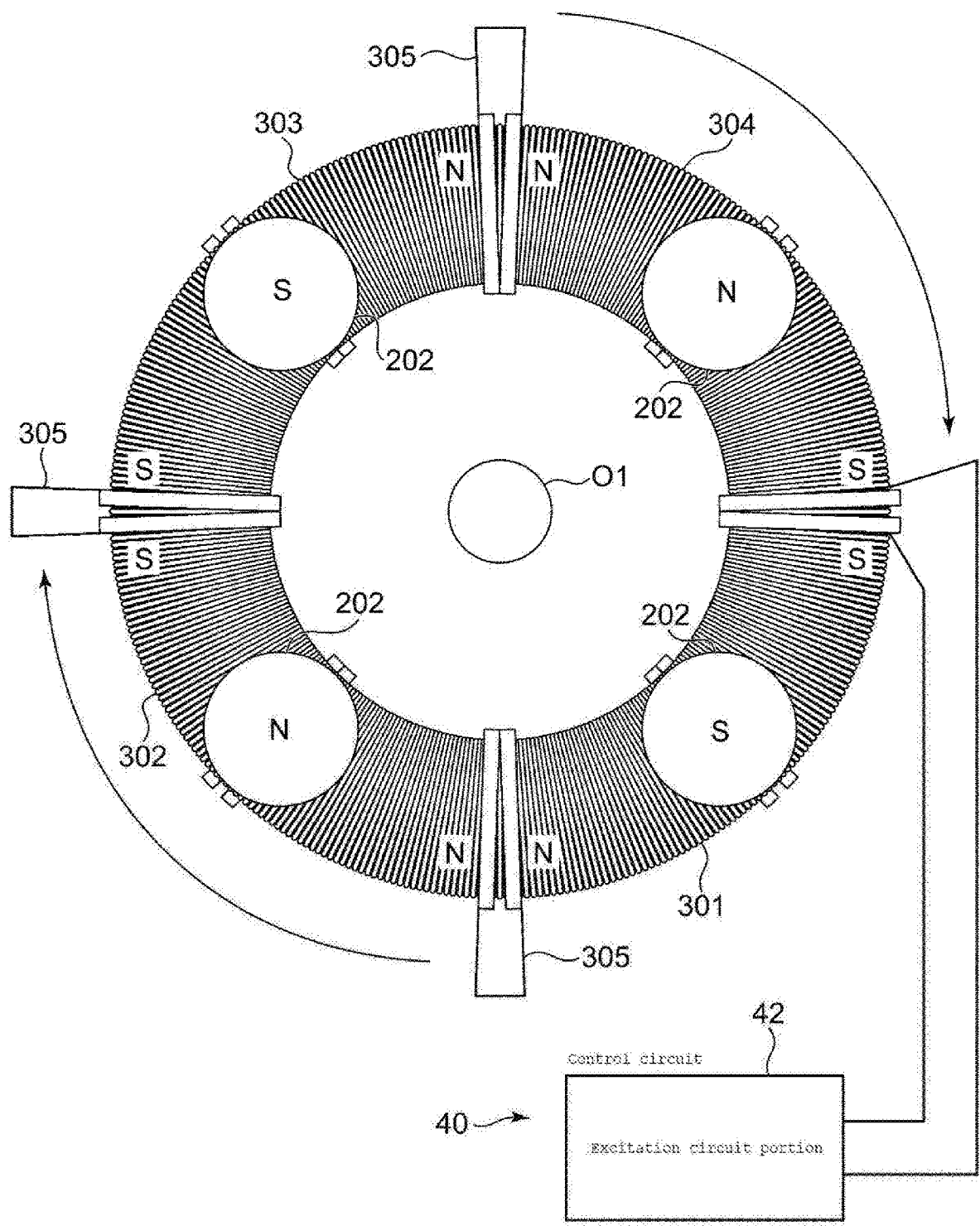
FIG. 14 is a view of an upper-stage stator and upper-stage permanent magnets that face the upper-stage stator of the electric motor shown in FIG. 13.

In this stator 300, the respective windings 301 to 304 are connected together by means of connection wires 305 as shown in FIG. 14, and hence are connected together in series. In addition, wires from both ends of the series-connected stator 300 (windings 301 to 304) are connected to the excitation circuit portion 42 of the control circuit 40.

In the windings 301 to 304 of the stator 300, wires are wound so that the ends facing each other generate the same poles by means of the excitation circuit portion 42.

The sensor portion (not shown) can include a transmission-type photo interrupter and a shielding plate that has a cutout portion passing through the photo interrupter in the same way as the sensor portion 41 of Embodiment 1 (see FIG. 1). The thus formed sensor portion makes it possible to detect the position of the permanent magnet 202 of the rotor 200. In Embodiment 5, the stator 300 includes the four windings 301 to 304, and the first stator 300a and the second stator 300b deviate from each other by 45 degrees along the rotation circumference, hence making it possible to detect four places at which the ends of the windings 301 to 304 face each other.

The operation of the electric motor 14 configured as above according to Embodiment 5 of the present invention will be described with reference to the drawings.

Figure 13:
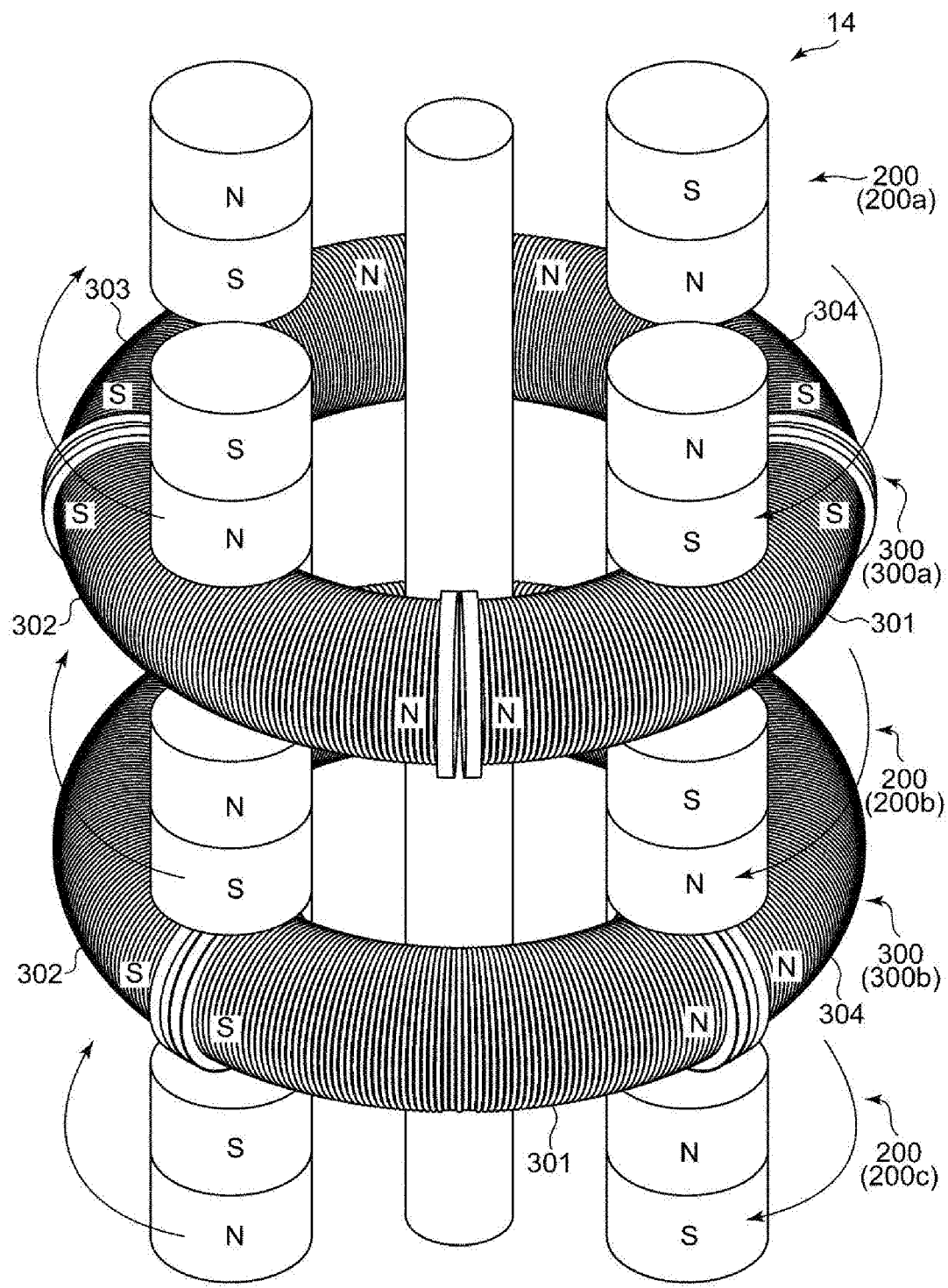
FIG. 13 is a perspective view to describe the operation of the electric motor shown in FIG. 11.

First, as an initialization state, the permanent magnet 202 is placed near a central part of each of the windings 301 to 304 of the upper stage stator 300 (first stator 300a) in the upper stage rotor 200 (first rotor 200a) whereas the permanent magnet 202 is placed near each end of the windings 301 to 304 of the lower stage stator 300 (second stator 300b) in the intermediate stage rotor (second rotor 200b) and the lower stage rotor (third rotor 200c) as shown in FIG. 13 and FIG. 14.

When the sensor portion detects that the intermediate stage rotor (second rotor 200b) and the lower stage rotor (third rotor 200c) are placed near the ends of the windings 301 to 304 of the lower stage stator 300, the excitation circuit portion 42 applies current so that, with respect to the upper stage stator 300 (first stator 300a), the ends at which the winding 301 and the winding 302 face each other become north poles, the ends at which the winding 302 and the winding 303 face each other become south poles, the ends at which the winding 303 and the winding 304 face each other become north poles, and the ends at which the winding 304 and the winding 301 face each other become south poles.

Additionally, the excitation circuit portion 42 applies current so that, with respect to the lower stage stator 300 (second stator 300b), the ends at which the winding 301 and the winding 302 face each other become south poles, the ends at which the winding 302 and the winding 303 face each other become north poles, the ends at which the winding 303 and the winding 304 face each other become south poles, and the ends at which the winding 304 and the winding 301 face each other become north poles as shown in FIG. 13.

As is understood from FIG. 13 and FIG. 14, the intermediate and lower stage rotors 200 and the lower stage stator 300 are placed so that the same poles face each other, and hence repel each other and rotate.

When the sensor portion detects that the rotor 200 has rotated by 45° while repelling the stator 300 and that the upper and intermediate stage permanent magnets 202 have approached the ends of the windings 301 to 304, the excitation circuit portion 42 reverses the current direction of the upper stage stator 300 and the current direction of the lower stage stator 300, and, as a result, the respective magnetic poles of the windings 301 to 304 are reversed.

Figure 15:
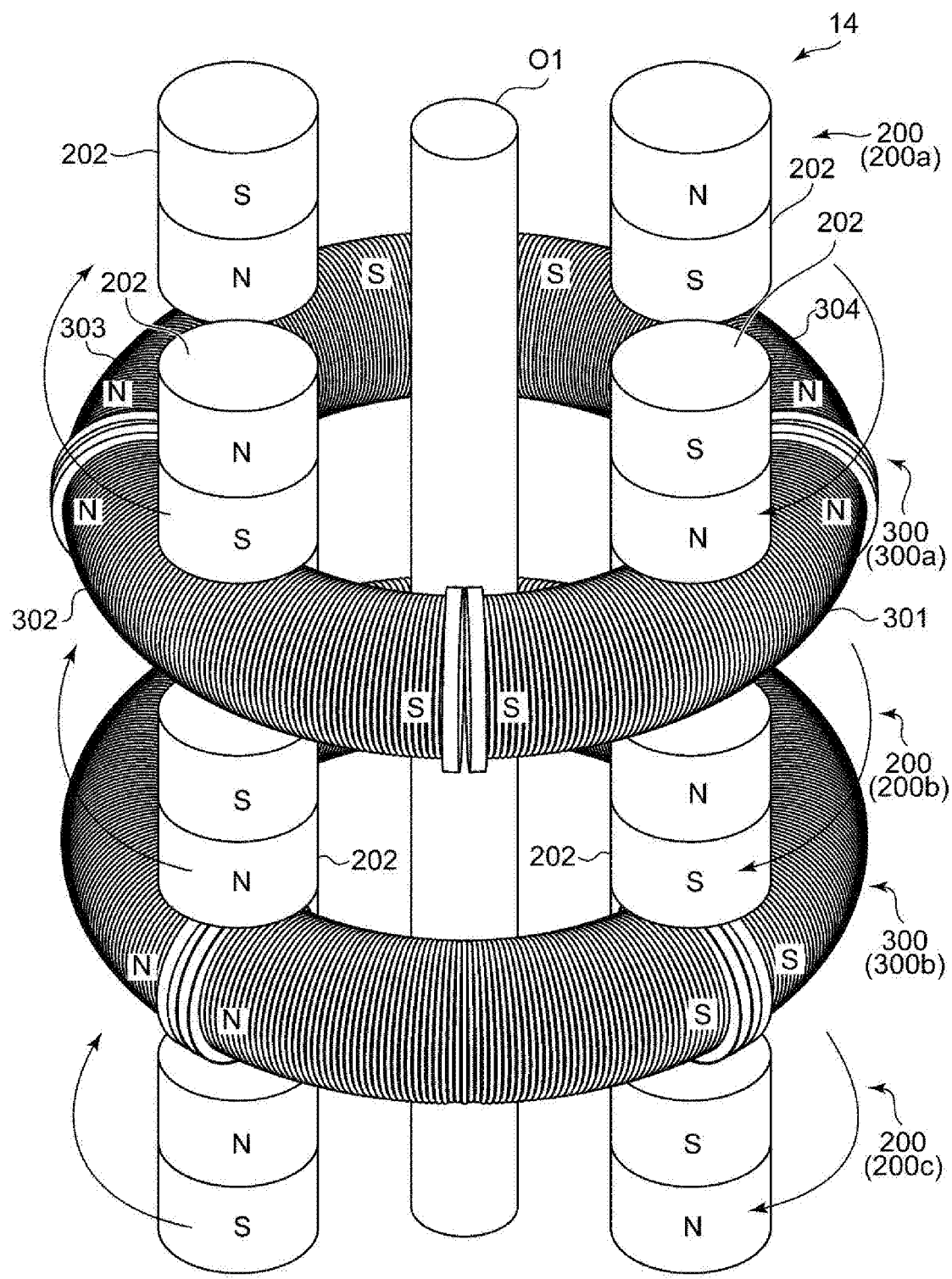
FIG. 15 is a perspective view of a state in which the rotor has rotated from the state of the electric motor of FIG. 13 by 45 degrees.
Figure 16:
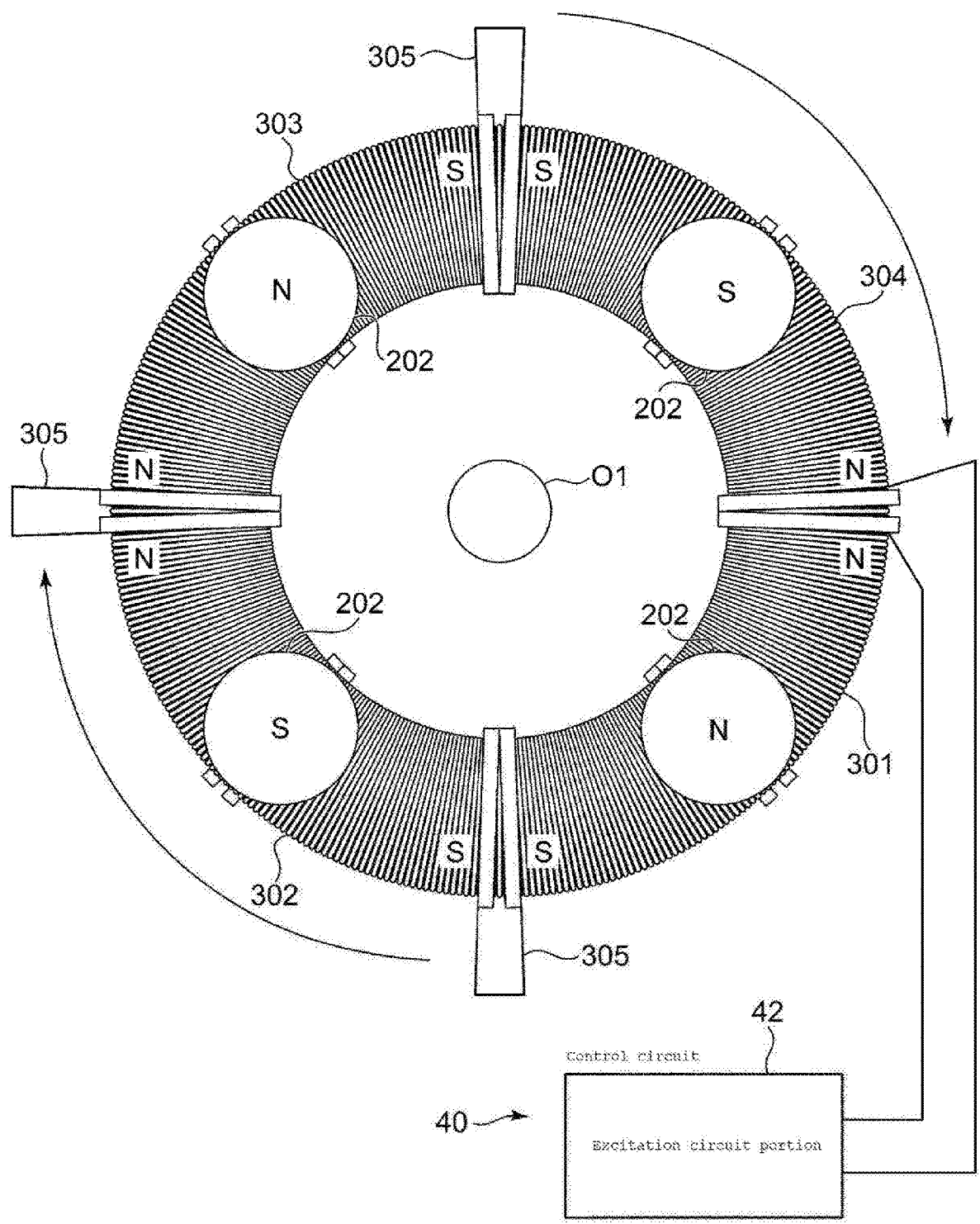
FIG. 16 is a view of an upper-stage stator and upper- and intermediate-stage permanent magnets that face the upper-stage stator of the electric motor shown in FIG. 15.

The respective magnetic poles of the windings 301 to 304 are reversed, and, as a result, the permanent magnets 202 of the upper and intermediate stage rotors 200 face the upper stage stator 300 in a state of being identical in the magnetic pole with each other, and hence rotate while repelling each other as shown in FIG. 15 and FIG. 16.

When the intermediate and lower stage rotors 200 repel the lower stage stator 300 in this way, the stator 300 reverses its magnetic pole, and, when the upper and intermediate stage rotors 200 repel the upper stage stator 300, the stator 300 reverses its magnetic pole. This is repeatedly performed, thus enabling the rotor 200 to continuously rotate.

In the electric motor 14, either one of the magnetic poles, i.e., either the north pole or the south pole of the permanent magnet 202 is directed in a direction along the rotational axis L1 of the rotor 200 as shown in FIG. 11, and the stator 300 is disposed along the rotation circumference R1 in a direction in which the magnetic pole of the rotor 200 is directed.

Therefore, the ends of the windings 301 to 304 face each other, and are not directed in the direction of the permanent magnet 202 of the rotor 200, and therefore a main magnetic flux from the permanent magnet 202 does not cross so as to straightly enter the inside of the cylinder of the windings 301 to 304.

Therefore, the electric motor 14 has a smaller electromotive force than an electric motor that operates as a conventional electric generator, and therefore it is possible to make a counter electromotive force smaller than the conventional one. Therefore, if it is the same in the number of rotations, it is possible to rotationally drive the electric motor 14 by means of a low voltage, and, if it is the same in voltage, it is possible to rotate the electric motor 14 at a high speed.

Additionally, in the same way as the electric motor 10 (see FIGS. 1A-B) according to Embodiment 1, the permanent magnet 202 of the rotor 200 shown in FIG. 11 is directed in the direction along the rotational axis L1, and, in the stator 300, the winding C1 is disposed along the rotation circumference R1 in the direction in which the magnetic pole of the permanent magnet 202 is directed.

Therefore, in the permanent magnet 202 stored in the housing (not shown), a direction in which a centrifugal force acts and a direction in which the windings 301 to 304 are approached are different from each other, and therefore the permanent magnet 202 never flies out from the housing even if the permanent magnet 202 is brought close to the windings 301 to 304 and is disposed in the housing and even if the rotor 200 is rotated at a high speed.

Therefore, it is possible to perform a long-time operation in a state in which the high-speed rotation of the rotor 200 is maintained.

Additionally, in the electric motor 14, gaps of the windings 301 to 304 are respectively placed at positions that deviate by 45 degrees along the circumferential direction between the first stator 300a and the second stator 300b. Therefore, even if the rotor 200 is about to be decelerated or stopped because of gaps between the ends of one stator 300, the rotor 200 is capable of being rotationally driven by one other stator 300. Therefore, the rotor 200 is capable of continuously rotating without being decelerated.

Embodiment 6

Figure 17:
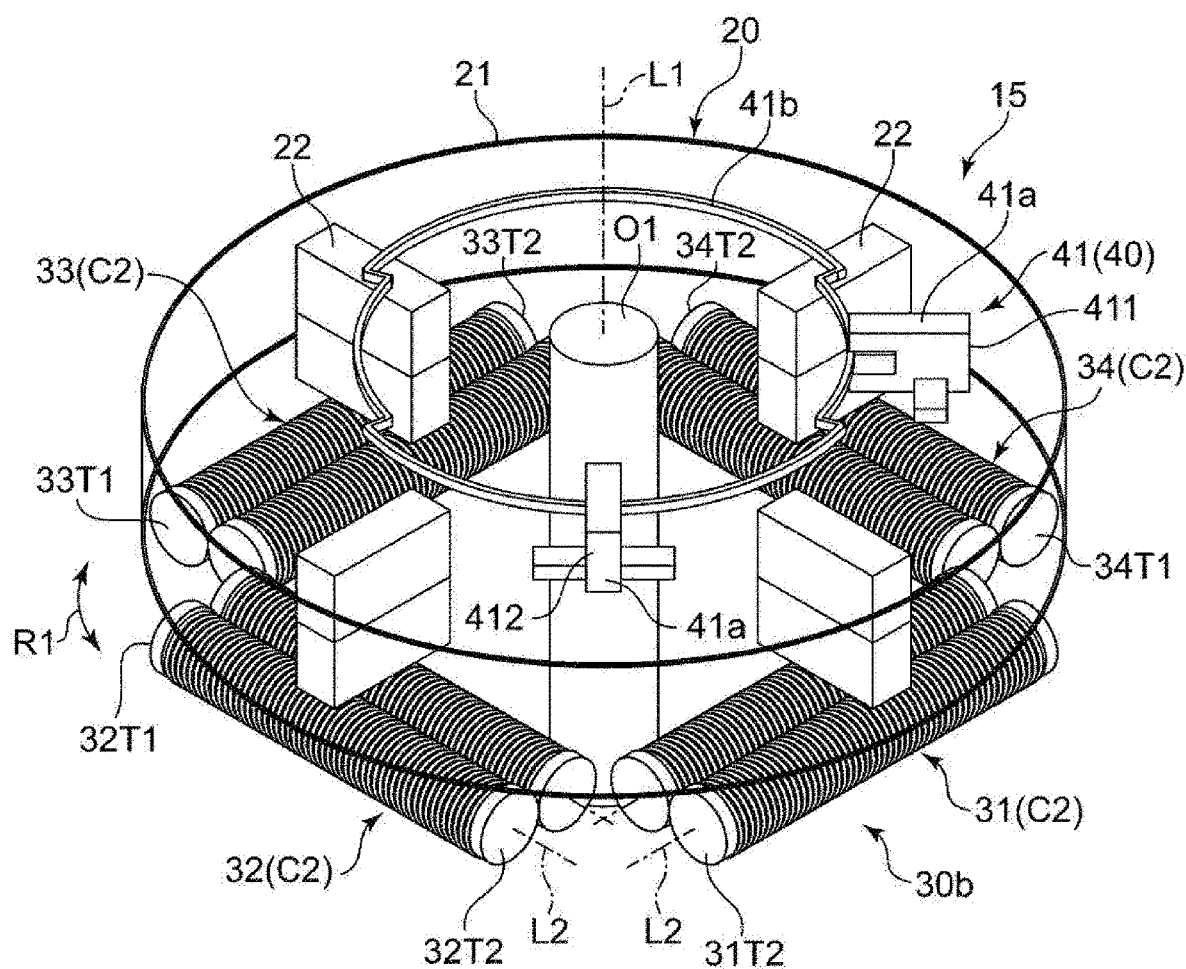
FIG. 17 is a perspective view to describe an electric motor as a rotary electric machine according to Embodiment 6 of the present invention.

An electric motor will be described as an example of a rotary electric machine according to Embodiment 6 of the present invention with reference to the drawings. In FIG. 17, the same reference sign is given to the same constituent as in FIG. 5B, and a description of the constituent is omitted.

In an electric motor 15 according to Embodiment 6 shown in FIG. 17, the windings C2 of a stator 30b that surround a centrally positioned output shaft O1 serving as a rotational center of the rotor 20 are disposed along the rotation circumference R1 in a direction in which the magnetic pole of the permanent magnet 22 is directed, and the axis L2 along a tangent of the rotation circumference R1 of the rotor 20 is formed linearly in the same way as in the electric motor 11 of Embodiment 2. In addition, with respect to the windings C2, two windings are electrically connected together in parallel in a state in which the two windings parallel to each other are arranged in the radial direction of the rotation circumference R1.

The plurality of windings C2 of the stator 30b whose axis L2 is formed linearly are connected in parallel with each other in this way, thus making it possible to restrict the resistance value of the stator 30b to a low value.

Therefore, it is possible to pass a larger amount of electric current when the winding C2 is two or more in number than when the winding C2 is one in number, and therefore it is possible to enhance the driving force of the rotor 20.

Although the stator 30b is formed of the windings C2 in which one set consists of two windings in Embodiment 6, one set may consist of three or more windings. Additionally, a plurality of windings C2 may be disposed along the rotational axis L1 of the output shaft O1.

Although the first to fourth windings 31 to 34 and the windings 301 to 304 shown in FIGS. 1A-B, FIGS. 5A-B, FIG. 6, FIG. 7, FIG. 8, FIG. 11, and FIG. 17 are formed as stators in Embodiments 1 to 6, the winding may be formed in an annular shape in which a pair of windings each of which has a semicircle are used, or in which three windings each of which has an angle of 120 degrees are used, or in which five or more windings are used.

Even in any case, the winding direction and the energization direction are controlled so that ends of two adjoining windings generate the same magnetic pole.

When the stator is formed of an odd number of windings, one place at which ends of adjoining windings become mutually different poles is created even if their ends are set to become the same magnetic poles. However, it is possible to regard the place at which ends of adjoining windings become mutually different poles as windings that are quasi-connected as a magnetic circuit. Therefore, a useless gap is generated between adjoining windings although no problems occur, and therefore it is preferable to set the number of windings as an even number of windings.

Although the rotary electric machine of the present invention used as the electric motors 10 to 15 has been described in Embodiments 1 to 6, the rotary electric machine is also usable as an electric generator.

Additionally, although the rotation speed control portion 50 shown in FIG. 9 includes the rectifier portion 51 in Embodiment 4, the consumption portion 52 may be connected directly to the power generation windings 35a to 35d if electric power sent from the power generation windings 35a to 35d is directly consumable.

Figure 18:
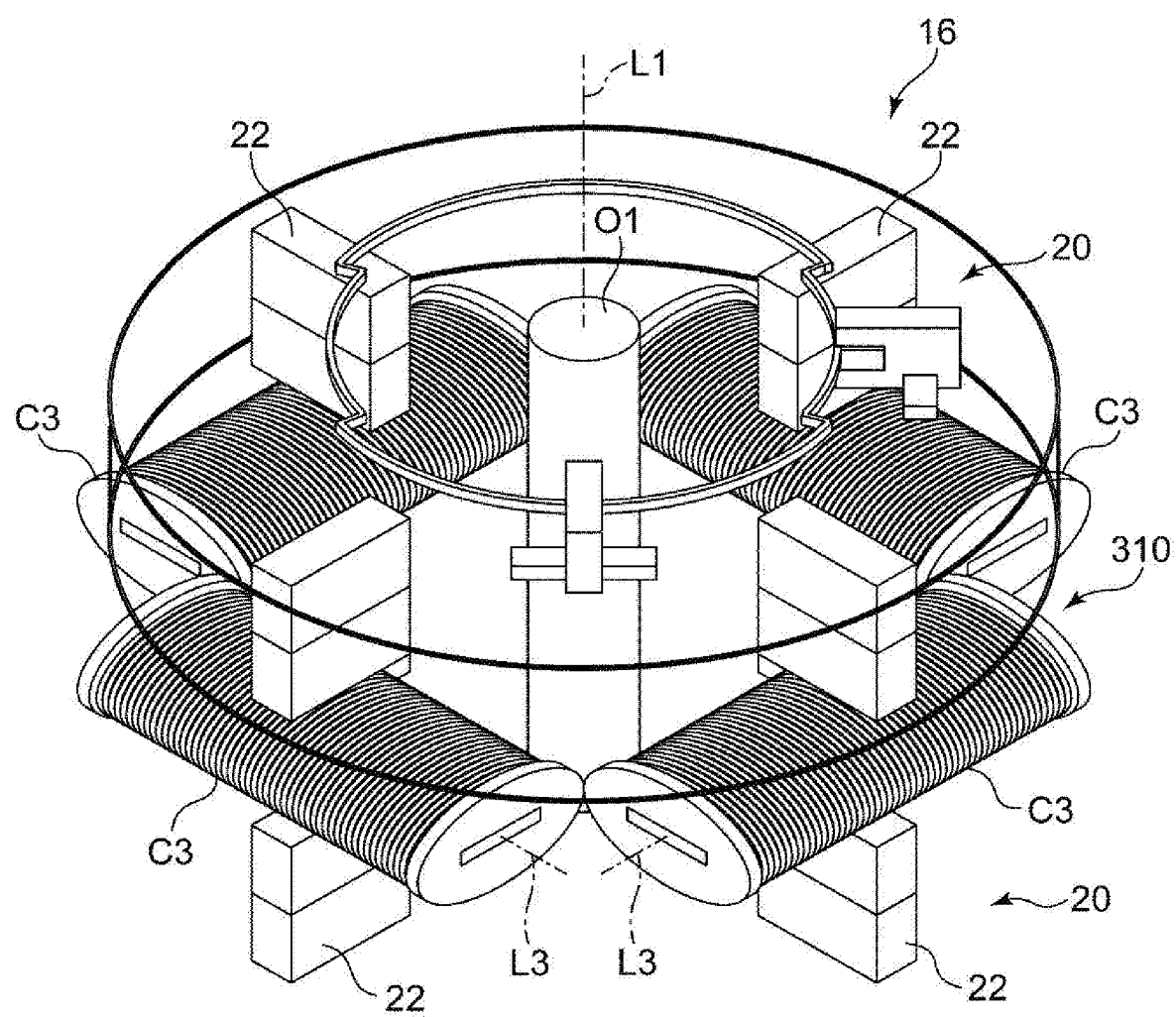
FIG. 18 is a view of an electric motor in which the windings of the stator of the electric motor of FIGS. 5A-B have been formed into windings each of which has a cross-sectionally elliptical shape and in which one other rotor is additionally provided on a side opposite to the rotor of FIGS. 5A-B with the stator between the one other rotor and the rotor of FIGS. 5A-B.

Additionally, the straight-pipe-shaped windings 33a to 33d (see FIG. 6) of the electric motor 12 according to Embodiment 3 and the straight-pipe-shaped windings 33a to 33d and the straight-pipe-shaped power generation windings 35a to 35d (see FIG. 8) of the electric motor 13 according to Embodiment 4 can also be provided in the electric motor 12 according to Embodiment 3 shown in FIG. 6, the electric motor 14 according to Embodiment 5 shown in FIG. 11, the electric motor 15 according to Embodiment 5 shown in FIG. 17, and an electric motor 16 shown in FIG. 18.

Although the stator 300 provided in the electric motor 14 according to Embodiment 5 shown in FIG. 11 consists of two stators, i.e., consists of an upper stage stator and a lower stage stator and although the rotor 200 provided therein consists of three stage rotors in such a way as to sandwich the stator 300 between the rotors, the number of rotors 200 provided therein and the number of stators 300 provided therein may be set to be equal to each other even if the stator 300 is one in number and the rotor 200 is one in number.

Still additionally, although the permanent magnet 202 is formed cylindrically in Embodiment 5, it may be formed spherically.

Additionally, for example, windings C3 of the electric motor 16 can also be formed so that the axis L3 is linear and so that the cross section perpendicular to the axis L3 is elliptical as shown in FIG. 18 although the winding C2 of the electric motor 11 shown in FIGS. 5A-B is formed so that the axis L2 is linear and so that the cross section perpendicular to the axis L2 is circular.

Additionally, a pair of rotors 20 are disposed with a stator 320 between the rotors 20.

The winding C3 is formed in an elliptical shape squeezed in the direction of the rotational axis L1 in this way, and therefore it is possible to dispose the permanent magnets 22 in a state in which the two permanent magnets 22 have been brought closer to each other than the winding formed in a cross-sectionally circular shape when the rotors 20 are disposed with the stator 320 between the rotors 20 on both sides, respectively.

Therefore, it is possible to place the magnetic poles of the permanent magnets 22 in a state in which the permanent magnet 22 has been brought close to the axis L3 of the winding C3 at which its magnetic force becomes strong, and therefore it is possible to increase the rotational force of the rotor 20.

Although the rotors 20 are disposed with the stator 320 between the rotors 20 on both sides in the present embodiment, the stator 320 may be disposed on either one of the sides.

Additionally, the winding is required to enable the magnetic pole of the permanent magnet 22 to approach the axis of the winding, and therefore, in the cross section of the winding, the length (thickness) in the direction along the rotational axis L1 is required to be formed so as to be shorter than the length (width) in the radial direction of the rotation circumference R1. Therefore, it is also possible to employ a shape in which the thickness in cross section of a winding is smaller than the width, i.e., employ a rectangular shape, or a diamond shape, or other polygonal shapes.

Additionally, it is also possible to form the winding C1 of FIGS. 1A-B in a shape squeezed in the direction of the rotational axis L1 even if this winding C1 is formed in a circular-arc shape although the axis L3 of the winding C3 is formed linearly in FIG. 18. Additionally, the winding C1 consisting of a plurality of windings may be provided in parallel in the same way as in the electric motor 15 shown in FIG. 17.

EXAMPLE

A rotary electric machine according to the present invention was manufactured, and was operated as an electric generator, and the generated power was measured.

The electric generator of the present example was made as a multistage electric generator, such as the electric motor 14 shown in FIG. 11.

In the stator of the electric generator as an inventive article, three stages each of which consists of four windings were disposed.

The winding was made by winding a copper wire whose thickness is 0.7 mm on a core whose diameter is 10 mm and whose length is 80 mm. The number of turns is 970 turns.

A neodymium magnet having a magnetic force whose grade is N52 was employed as the permanent magnet of the rotor.

Figure 19:
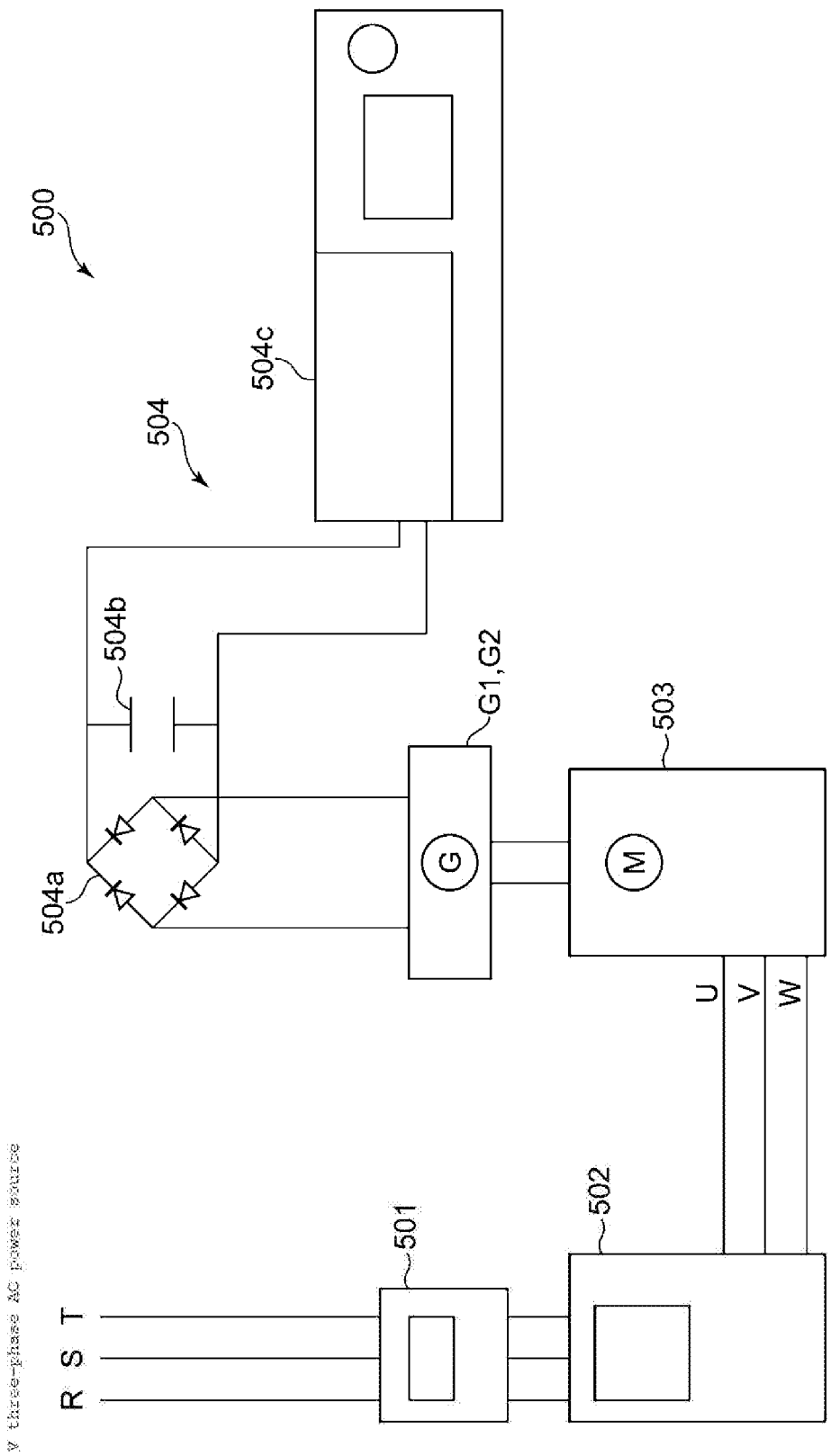
FIG. 19 is a view showing a configuration of a measurement system that measures the generated power of an inventive article and the generated power of a comparative article.

Next, a measurement system that measures the electric power of the inventive article will be described with reference to FIG. 19.

A measurement system 500 includes an electric power meter 501 that measures input power, an inverter 502 that adjusts voltage and frequency, an electric motor 503 that drives an electric generator G1, which is an inventive article, and an electric generator G2, which is a comparative article used to make a comparison between the inventive article and the comparative article, and a load portion 504.

KM50-C of OMRON Corporation was used as the electric power meter 501.

FR-A820-1.5K-1 of Mitsubishi Electric Corporation was used as the inverter 502.

IKH3-FCKLA21E-4P-1.5KW-220 of TOSHIBA CORPORATION was used as the electric motor 503.

The load portion 504 includes a diode bridge 504a that subjects an output emitted from the electric generator of the inventive article to full-wave rectification, a capacitor 504b that smoothes a pulsating flow emitted from the diode bridge 504a, and an electronic load device 504c that is capable of adjusting power consumption.

LN-1000C-G7 of KEISOKUGIKEN CO., LTD., was used as the electronic load device 504c.

The comparative article G2 is MCT-500 of Nidec Corporation.

With respect to the electric generator G1 of the inventive article and the electric generator G2 of the comparative article, input power and output power were measured by use of the measurement system 500 above, and measurement results were compiled into a table, and were graphed.

In the table shown in FIG. 20, electric power obtained by subtracting power consumption indicated when the electronic load device 504c is brought into a loaded state (open state) from electric power (total power consumption) measured by the electric power meter 501 was defined as input power. Therefore, input power indicated when the electronic load device 504c is brought into a loaded state (open state) is 0 W.

Input power into the electric generator G1 was gradually raised in order to measure the generated power of the electric generator G1, and the generated power stopped being measured, and thereafter input power into the electric generator G2 was combined with input power indicated when the generated power of the electric generator G1 was measured, and was gradually raised, and generated power into the electric generator G2 was measured.

Figure 21:
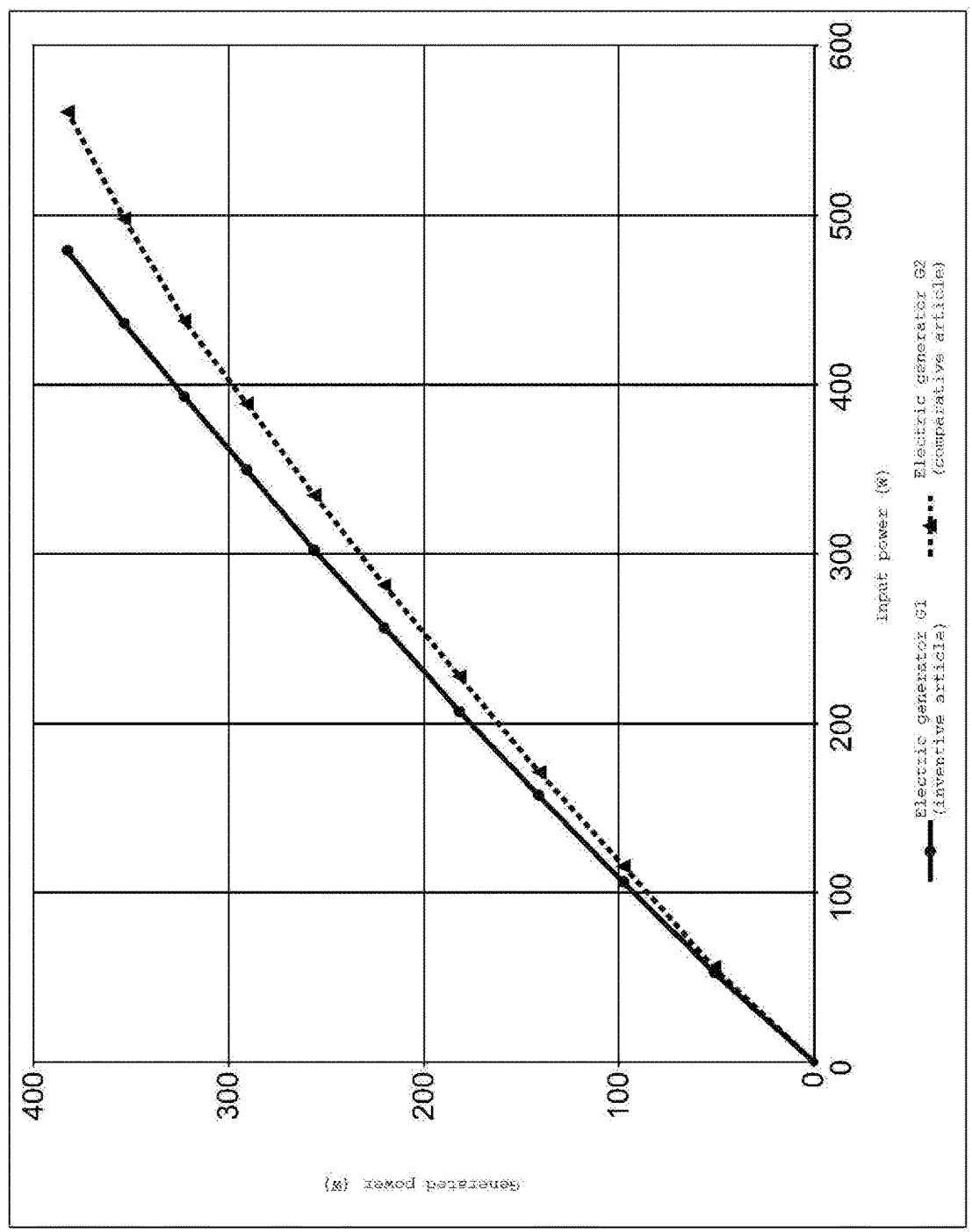
FIG. 21 is a view in which each value of the table shown in FIG. 20 is shown by a graph.

As is understood from the table shown in FIG. 20 and from the graph shown in FIG. 21, it is understood that the electric generator G1 that is an inventive article has higher generated power than the electric generator G2 that is a comparative article.

Therefore, it is understood that the rotary electric machine of the present invention functions as an electric motor, and, in addition, sufficiently functions as an electric generator.

INDUSTRIAL APPLICABILITY

The present invention is capable of efficiently obtaining a driving force by means of a plurality of rotors, and hence is suitable for a machine in which an electric motor is used.

The invention claimed is:

1. A rotary electric machine comprising:
a first rotor, a second rotor, and a third rotor, each of which includes a plurality of permanent magnets disposed along a rotation circumference of the rotor wherein a magnetic pole of each of the permanent magnets is directed in a direction along a rotational axis of the rotor; and
a first stator, and a second stator, each of which includes a plurality of windings disposed along a rotation circumference, having a gap between adjacent windings such that ends of the adjacent windings face each other, wherein the first stator is disposed between the first and second rotors and the second stator is disposed between the second and third rotors,
wherein each of the plurality of windings is formed in a direction in which a magnetic path from an end of said winding to an inside of said winding intersects a main magnetic flux direction from one of the permanent magnets when the magnetic pole of said permanent magnet is directed towards said winding,
wherein the first and second stators are provided along the rotational axis of the first, second, and third rotors, and
wherein the first and second stators are respectively placed at positions at which the gaps of the first stator and the gaps of the second stator deviate from each other in a rotation circumference direction.

2. The rotary electric machine according to claim 1, wherein each of the windings of the first and second stators has a circular-arc shape along the rotation circumference of the rotor.

3. The rotary electric machine according to claim 1, wherein windings of the first stator and the windings of the second stator surround a rotor shaft and are in parallel with each other.

4. The rotary electric machine according to claim 1, wherein the plurality of permanent magnets of the first rotor, the plurality of permanent magnets of the second rotor, and the plurality of permanent magnets of the third rotor are positioned over each other.

5. The rotary electric machine according to claim 4, wherein a magnet pole of one of the plurality of permanent magnets of the first rotor and a facing magnet pole of a corresponding one of the plurality of permanent magnets of the second rotor are identical.

6. The rotary electric machine according to claim 5, wherein a magnet pole of one of the plurality of permanent magnets of the second rotor and a facing magnet pole of a corresponding one of the plurality of permanent magnets of the third rotor are identical.

7. The rotary electric machine according to claim 6, wherein the windings of the first stator and the windings of the second stator surround a rotor shaft and are in parallel with each other.

8. The rotary electric machine according to claim 6, wherein the first and second stators are respectively placed at positions at which the gaps of the first stator and the gaps of the second stator deviate by 45 degree from each other in the rotation circumference direction.

9. The rotary electric machine according to claim 5, wherein the windings of the first stator and the windings of the second stator surround a rotor shaft and are in parallel with each other.

10. The rotary electric machine according to claim 5, wherein each of the windings of the first and second stators has a circular-arc shape along the rotation circumference of the rotor.

11. The rotary electric machine according to claim 5, wherein the first and second stators are respectively placed at positions at which the gaps of the first stator and the gaps of the second stator deviate by 45 degree from each other in the rotation circumference direction.

12. The rotary electric machine according to claim 4, wherein the windings of the first stator and the windings of the second stator surround a rotor shaft and are in parallel with each other.

13. The rotary electric machine according to claim 4, wherein each of the windings of the first and second stators has a circular-arc shape along the rotation circumference of the rotor.

14. The rotary electric machine according to claim 13, wherein the first and second stators are respectively placed at positions at which the gaps of the first stator and the gaps of the second stator deviate by 45 degree from each other in the rotation circumference direction.

15. The rotary electric machine according to claim 4, wherein the first and second stators are respectively placed at positions at which the gaps of the first stator and the gaps of the second stator deviate by 45 degree from each other in the rotation circumference direction.

16. The rotary electric machine according to claim 1, wherein the first and second stators are respectively placed at positions at which the gaps of the first stator and the gaps of the second stator deviate by 45 degree from each other in the rotation circumference direction.

17. The rotary electric machine according to claim 1, wherein each of the windings of the first and second stators has a circular-arc shape along the rotation circumference of the rotor, and wherein the first and second stators are respectively placed at positions at which the gaps of the first stator and the gaps of the second stator deviate by 45 degree from each other in the rotation circumference direction.

18. A rotary electric machine comprising:
  a rotor including a plurality of permanent magnets disposed therein in a housing along a rotation circumference wherein a magnetic pole of each of the permanent magnets is directed in a direction along a rotational axis; and
  a stator including a plurality of windings disposed along a rotation circumference,
  wherein each of the plurality of windings is formed in a direction in which a magnetic path from an end of said winding to an inside of said winding intersects a main magnetic flux direction from one of the permanent magnets when the magnetic pole of said permanent magnet is directed toward said winding, and
  wherein an auxiliary winding is provided between ends of the plurality of windings,
  wherein a power generation winding is provided coaxially with the auxiliary winding.

19. The rotary electric machine according to claim 18, wherein a rotation speed control portion is connected to the power generation winding to adjust an electric current emitted from the power generation winding.

20. The rotary electric machine according to claim 19, wherein the rotation speed control portion comprises:
  a rectifier portion connected to the power generation winding; and
  a consumption portion configured to consume an electric current emitted from the rectifier portion.

* * * * *